United States Patent
Fletcher et al.

(10) Patent No.: US 10,738,766 B2
(45) Date of Patent: *Aug. 11, 2020

(54) RAILCAR FIXTURES FOR TRANSPORTATION OF WIND TURBINE BLADES AND METHOD INVOLVING SAME

(71) Applicant: Martin Bencher USA, LLC, Springfield, NJ (US)

(72) Inventors: Scott R. Fletcher, Covington, TN (US); John D. Glover, Mobile, AL (US)

(73) Assignee: Martin Bencher USA, LLC, Springfield, NJ (US)

( * ) Notice: Subject to any disclaimer, the term of this patent is extended or adjusted under 35 U.S.C. 154(b) by 579 days.

This patent is subject to a terminal disclaimer.

(21) Appl. No.: 15/473,332

(22) Filed: Mar. 29, 2017

(65) Prior Publication Data

US 2018/0223811 A1    Aug. 9, 2018

Related U.S. Application Data

(63) Continuation of application No. 15/426,834, filed on Feb. 7, 2017, now Pat. No. 9,638,162.

(51) Int. Cl.

| B60P 7/08 | (2006.01) |
| --- | --- |
| F03D 13/40 | (2016.01) |
| B60P 3/40 | (2006.01) |
| B60P 7/12 | (2006.01) |
| B61D 45/00 | (2006.01) |
| B61D 3/16 | (2006.01) |
| B60P 1/64 | (2006.01) |

(52) U.S. Cl.
CPC .............. *F03D 13/40* (2016.05); *B60P 1/649* (2013.01); *B60P 1/6409* (2013.01); *B60P 3/40* (2013.01); *B60P 7/12* (2013.01); *B61D 3/16* (2013.01); *B61D 3/166* (2013.01); *B61D 45/00* (2013.01); *B61D 45/001* (2013.01); *B61D 45/003* (2013.01); *B61D 45/008* (2013.01); *F05B 2240/941* (2013.01)

(58) Field of Classification Search
CPC ..... F03D 13/40; B61D 45/001; B61D 45/008; B61D 45/003; B61D 45/00; B61D 3/16; B60P 7/12; B60P 3/40; B60P 1/6409; B60P 1/649; Y02E 10/721; F05B 2240/941
USPC ........... 410/32, 34, 44, 45, 53, 96, 120, 155; 280/404; 105/355
See application file for complete search history.

(56) References Cited

U.S. PATENT DOCUMENTS

| 7,591,621 B1 | 9/2009 | Landrum et al. |
| 7,670,090 B1 | 3/2010 | Landrum et al. |
| 8,056,203 B2 | 11/2011 | Madsen |

(Continued)

*Primary Examiner* — Stephen T Gordon
(74) *Attorney, Agent, or Firm* — Hovey Williams LLP

(57) ABSTRACT

A transport system for transporting a wind turbine blade on first and second railcars that serve as load cars. A root end fixture on the first railcar is connected to a root end portion of the wind turbine blade. A mid-frame fixture on the second railcar supports a reinforced midsection of the wind turbine blade using a pair of support saddles. A tip end fixture restrains a tip end portion of the wind turbine blade against lateral movement outside of a preselected range of movement in opposite lateral directions and causing bending of the blade about the mid-frame fixture when the restraint device imparts sufficient restraining force to the tip end portion of the blade.

19 Claims, 21 Drawing Sheets

(56) References Cited

U.S. PATENT DOCUMENTS

| | | |
|---|---|---|
| 8,096,739 B1 | 1/2012 | Landrum et al. |
| 8,142,120 B2 | 3/2012 | Landrum et al. |
| 8,192,117 B1 | 6/2012 | Landrum et al. |
| 8,366,361 B1 | 2/2013 | Landrum et al. |
| 8,382,407 B1 | 2/2013 | Landrum et al. |
| 8,500,378 B1 | 8/2013 | Landrum et al. |
| 8,529,174 B1 | 9/2013 | Landrum et al. |
| 8,641,339 B2 | 2/2014 | Schibsbye et al. |
| 8,708,625 B1 | 4/2014 | Landrum et al. |
| 8,834,082 B1 | 9/2014 | Landrum et al. |
| 8,920,083 B2 | 12/2014 | Peterson |
| 9,315,200 B1 | 4/2016 | Landrum et al. |
| 9,347,426 B2 | 5/2016 | Landrum et al. |
| 9,494,140 B2 | 11/2016 | Sigurdsson |
| 9,638,162 B1 * | 5/2017 | Fletcher .................... F03D 1/00 |
| 2013/0142585 A1 | 6/2013 | Yogodzinski |
| 2016/0017861 A1 | 1/2016 | Sigurdsson |

* cited by examiner

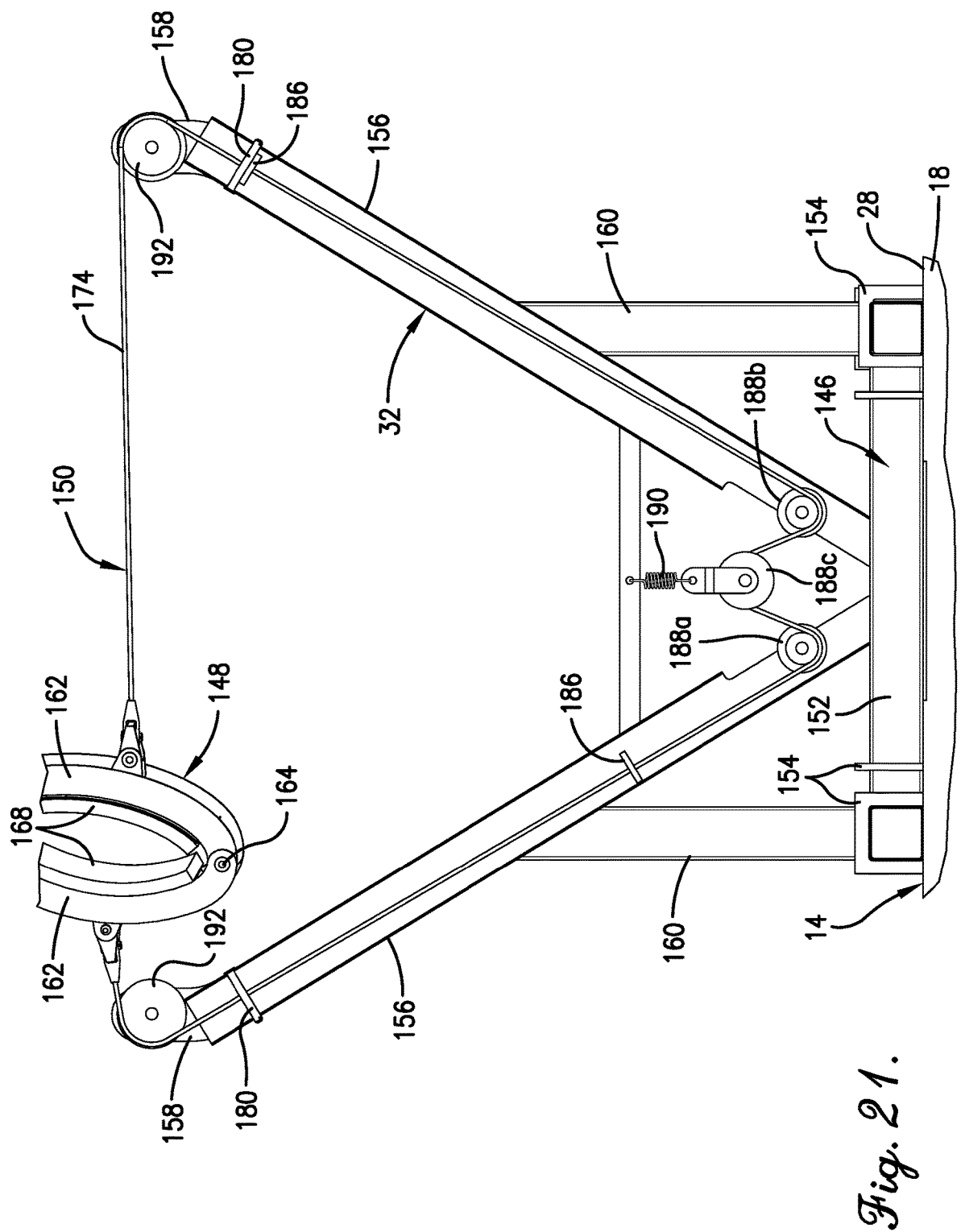

RAILCAR FIXTURES FOR TRANSPORTATION OF WIND TURBINE BLADES AND METHOD INVOLVING SAME

RELATED APPLICATION

This application is a continuation of U.S. application Ser. No. 15/426,834 filed Feb. 7, 2017, with the above-identified application being incorporated by reference herein in its entirety.

BACKGROUND OF THE INVENTION

The present invention relates generally to the transportation of items on a railroad and, more particularly, to fixtures used to transport wind turbine blades on railcars for travel on the railroad and methods of supporting the wind turbine blades during such transport.

Wind farms employing large numbers of wind turbines to generate electricity have become increasingly popular alternative energy sources. The wind turbine blades, towers, hubs, nacelles and other components are normally transported separately by cargo ship, truck, and/or railcar from their manufacturing sites to the wind farms where they are assembled to form the operational wind turbines.

As wind turbines continue to grow in height and blade length, challenges have arisen in transporting the wind turbine blades by railcar. When a wind turbine blade is transported by railcar, a root end fixture and a mid-frame fixture are normally mounted on the deck of the railcar and are used to support the root end and a reinforced midsection of the wind turbine blade, respectively. When the wind turbine blade has a length that is less than the length of a single railcar, the root end fixture and the mid-frame fixture are mounted on the same railcar. A longer wind turbine blade up to a certain length may still be supported by the root end and mid-frame fixtures that are located on the same railcar, with the tip end of the wind turbine blade extending over an adjacent railcar. In this arrangement, the railcar on which the root end and mid-frame fixtures are mounted is commonly referred to as the load car, and the adjacent railcar over which the tip end extends is commonly referred to as the idler car. For wind turbine blades of even greater length, the mid-frame fixture must be located on the adjacent railcar from the root end fixture and both of the railcars operate as load cars. Placement of the root end and mid-frame fixtures on separate railcars is problematic because one or both of the fixtures must be permitted to move about one or more pivot axes to accommodate the relative movement between the adjacent railcars as they navigate curved sections of the railroad.

The longer wind turbine blades create additional problems because their tip ends must be restrained from swinging outwardly beyond a specified distance from the railcar as the railcars travel around curved sections of the railroad. Keeping the tip ends within the specified clearance window is particularly problematic with blade configurations having a curved profile that is designed to prevent the tip end of the blade from contacting the support tower of the operating wind turbine when wind loads cause flexure of the rotating blades. Tip end fixtures have been developed to retain the tip end of the wind turbine blade within the specified clearance window during railcar transport, but the challenge of restraining the wind turbine blade without causing damage to it has become more difficult as the wind turbine blades continue to increase in length and have adopted the curved profile.

A need has thus developed for improved fixtures for supporting wind turbine blades during railcar transport.

SUMMARY OF THE INVENTION

In one aspect, the present invention is directed to a transport system for transporting a wind turbine blade along a railroad. The transport system comprises a first railcar and a second railcar that are coupled together, a root end fixture mounted to the first railcar for connecting with and supporting a root end portion of the wind turbine blade so that the wind turbine blade extends longitudinally along at least the first and second railcars, a mid-frame fixture mounted to the second railcar for supporting a midsection of the wind turbine blade, and a tip end fixture mounted to the second railcar. The tip end fixture comprises a pair of uprights having upper ends that are spaced apart from each other, a halo for mounting on a tip end portion of the wind turbine blade, and a restraint device interconnecting the halo with both of the uprights for exerting a restraining force on the halo to stop movement of the tip end portion outside of a preselected range of movement in opposite lateral directions.

In another aspect, the present invention is directed to the transport system described above in which the mid-frame fixture comprises a frame assembly and a pair of support saddles that are carried by the frame assembly and within which a midsection of the wind turbine blade may be supported.

In a further aspect, the present invention is the transport system described above in which the root end fixture comprises a frame for engagement with the root end of the wind turbine blade and rocking connectors that attach the frame to an upper bolster plate and allow pivoting of the frame about a horizontal axis oriented in the transverse direction.

The present invention is also directed to a method of transporting a wind turbine blade loaded on the transport system, comprising the steps of using the restraint device to restrain a tip end portion of the wind turbine blade against lateral movement outside of a preselected range of movement in opposite lateral directions, and causing bending of the blade about the mid-frame fixture when the restraint device imparts sufficient restraining force to the tip end portion of the blade.

BRIEF DESCRIPTION OF THE DRAWINGS

In the accompanying drawings that form part of the specification and in which like reference numerals are used to indicate like components in the various views:

FIG. 21 is a fragmentary end elevation view of a further embodiment of a tip end fixture with portions broken away to show details of construction.

DETAILED DESCRIPTION

Figure 1:
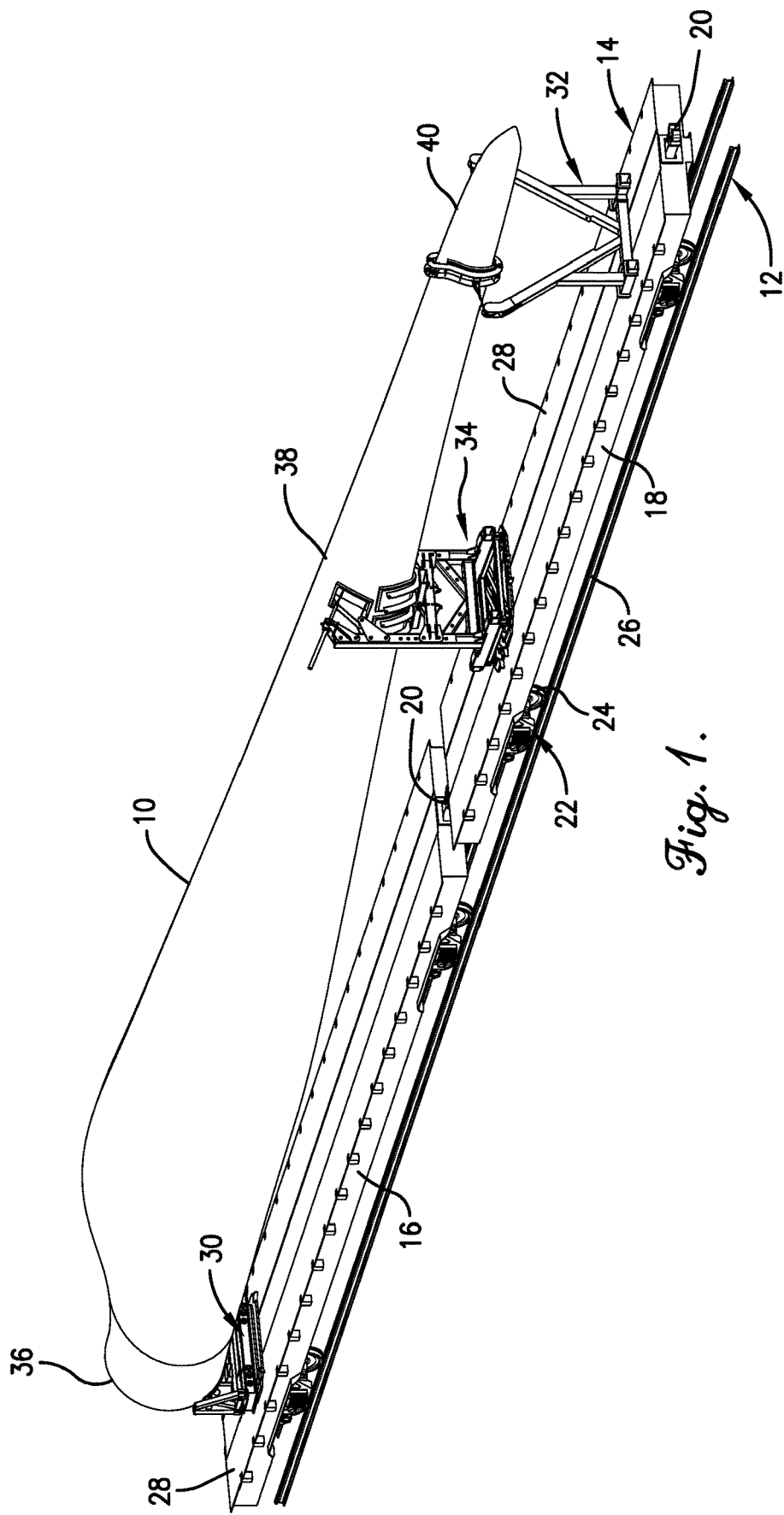
FIG. 1 is a side perspective view of a wind turbine blade supported by fixtures that are mounted on first and second connected railcars on a straight length of a railroad.
Figure 2:
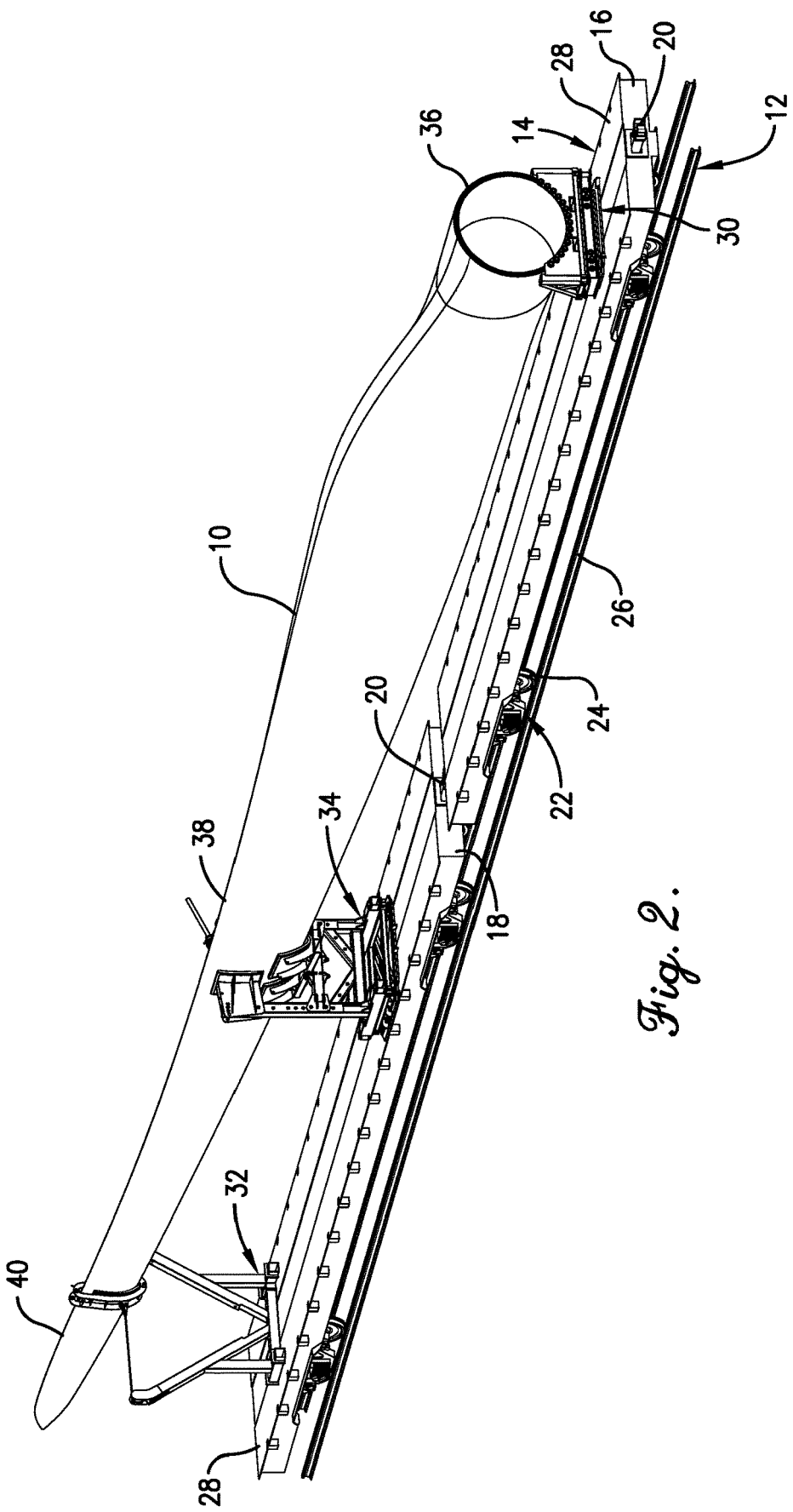
FIG. 2 is a perspective view of the supported wind turbine blade on the straight length of railroad tracks similar to that shown in FIG. 1, but taken from an opposite lateral side and opposite end of the wind turbine blade.

Turning now to the drawings in greater detail and initially to FIGS. 1 and 2, a transport system for conveying a wind turbine blade 10 along a railroad 12 is designated generally by the numeral 14. The transport system includes a first railcar 16 and an adjacent second railcar 18 that is connected to the first railcar 16 using couplers 20 positioned at the adjacent ends of the first and second railcars 16 and 18. Couplers 20 are normally also positioned at the opposite ends of the first and second railcars 16 and 18 so that they may be connected to other railcars that may be of the same or different construction. In one embodiment, each of the first and second railcars 16 and 18 is a flatcar that may be of conventional construction, comprising a pair of spaced apart trucks 22 that carry wheelsets 24 that ride along the rails 26 of the railroad 12 and an upper, generally flat platform 28 that is supported by the trucks 22. The first and second railcars 16 and 18 are pushed and/or pulled along the railroad 12 by one or more locomotives, which are not shown because they may be of conventional construction. The couplers 20 joining the first and second railcars 16 and 18 are normally fixed against moving in and out in a longitudinal direction, such as by the insertion of plates (not shown) into slots (not shown) provided in the platforms 28 of the first and second railcars 16 and 18.

In addition to the first and second railcars 16 and 18, the transport system 14 includes a root end fixture 30 that is supported on the platform 28 of the first railcar 16 and is located at an end region opposite from the second railcar 18, a tip end fixture 32 that is supported on the platform 28 of the second railcar 18 and is located at an end region opposite from the first railcar 16, and a mid-frame fixture 34 that is also supported on the platform 28 of the second railcar 18 and is located between the tip end fixture 32 and the root end fixture 30. As described in greater detail below, the root end fixture 30 and the mid-frame fixture 34 support a root end 36 and a midsection 38 of the wind turbine blade 10, respectively, and the tip end fixture 32 controls the distance that a tip end portion 40 of the wind turbine blade 10 may swing laterally as the first and second railcars 16 and 18 travel along curved lengths of the railroad 12.

Figure 3:
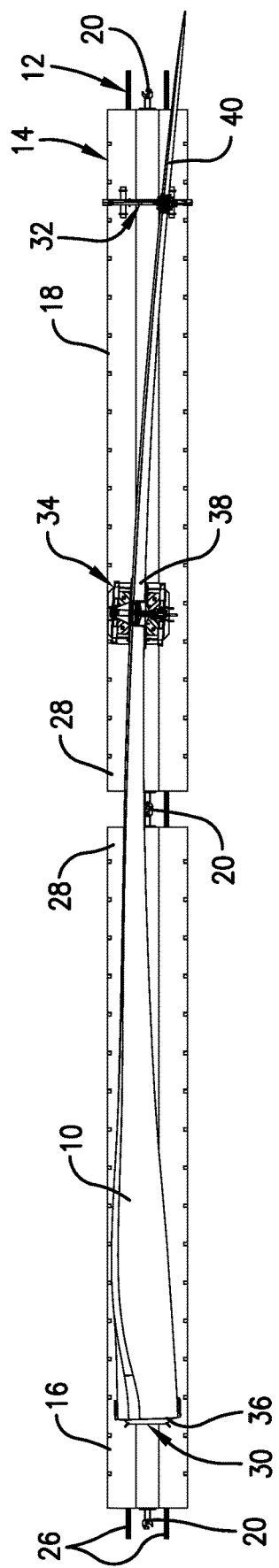
FIG. 3 is a top plan view of the supported wind turbine blade on the straight length of the railroad.

The positioning and movement of the wind turbine blade 10 as the first and second railcars 16 and 18 travel along straight lengths and the curved lengths of the railroad is illustrated in FIGS. 3-7. In FIG. 3, the first and second railcars 16 and 18 are shown in longitudinal alignment on a straight length of the railroad 12 and the manufactured curved profile of the wind turbine blade 10 can be seen as it is positioned longitudinally along the first and second railcars 16 and 18. In one embodiment, when the first and second railcars 16 and 18 are longitudinally aligned in this fashion, the tip end portion 40 of the wind turbine blade 10 may be positioned off-center in a lateral direction in the tip end fixture 32 to accommodate the curved profile of the wind turbine blade 10. Similarly, the mid-frame fixture 34 may be positioned off-center in an opposite lateral direction to accommodate the curved profile of the wind turbine blade 10. If the mid-frame fixture 34 is positioned off-center and closer to one side of the second railcar 18, ballast may need to be added on the platform 28 on the opposite side of the second railcar 18 in approximate longitudinal alignment with the mid-frame fixture 34 to balance the load on the second railcar 18. For longer wind turbine blades 10, some of the tip end portion 40 may overhang a third railcar (not shown), which may serve as an idler car while the first and second railcars 16 and 18 serve as load cars.

Figure 4:
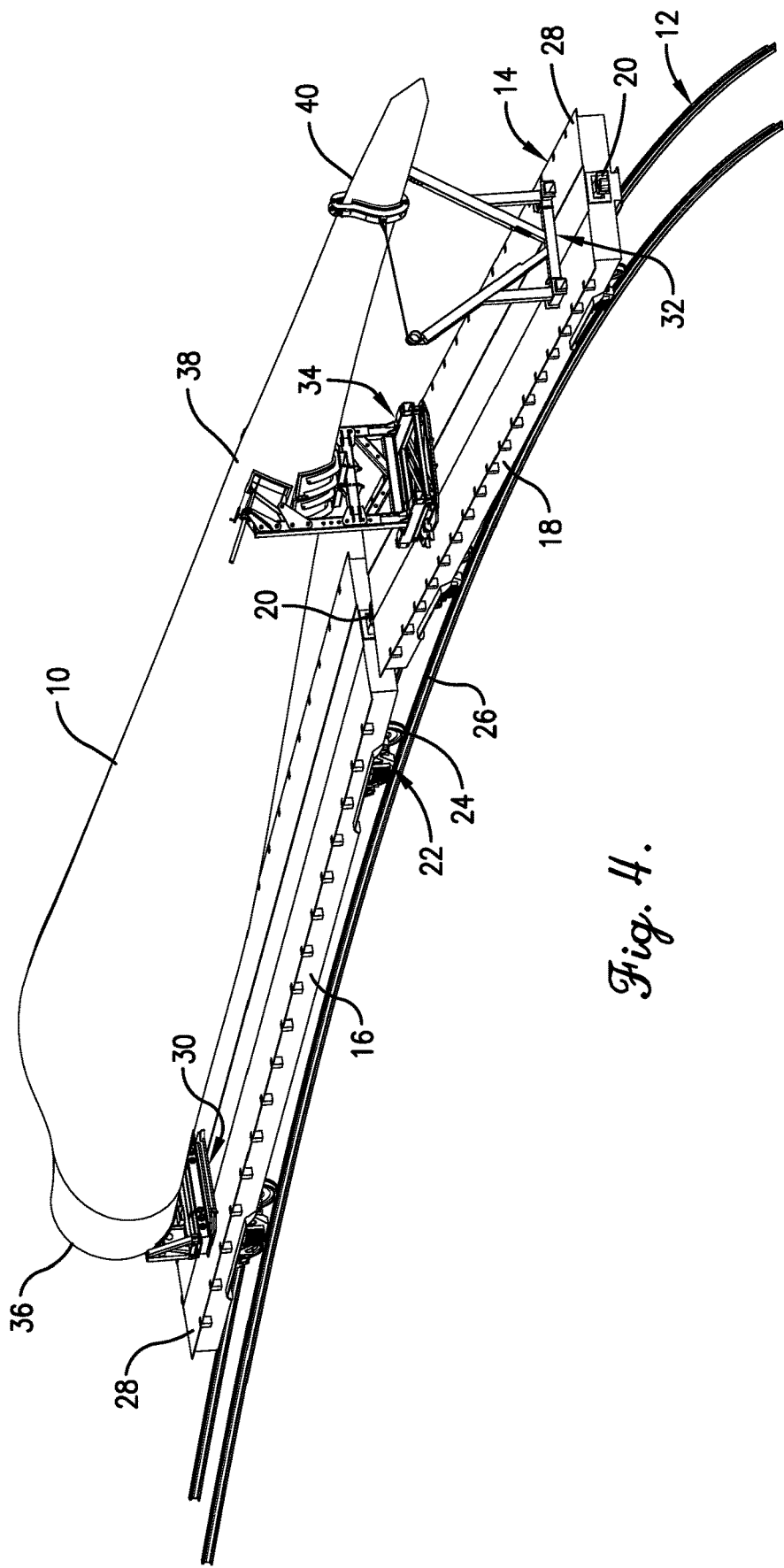
FIG. 4 is a side perspective view of the supported wind turbine blade shown on a curved length of the railroad.
Figure 5:
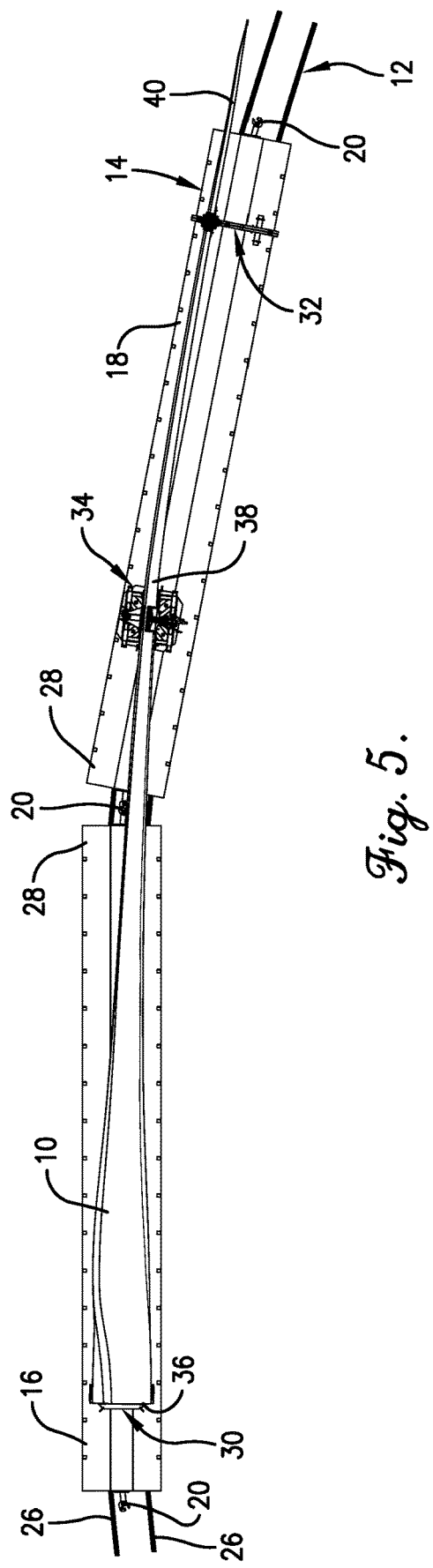
FIG. 5 is a top plan view of the supported wind turbine blade on the curved length of the railroad shown in FIG. 4.

When the first and second railcars 16 and 18 are positioned on a length of the railroad 12 that is curved as shown in FIGS. 4 and 5, the first and second railcars 16 and 18 are displaced from their longitudinal alignment to an angled relationship. This, in turn, causes the tip end portion 40 of the wind turbine blade 10 to swing outwardly in a lateral direction toward the outside of the curved length of the railroad 12. The tip end fixture 32 limits the distance the tip end portion 40 may move in that lateral direction and thereby retains the tip end portion 40 within the lateral clearance window established for the particular railroad 12 on which the transport system 14 is traveling. When the tip end portion 40 reaches the intended limit of its laterally outward travel, it is restrained from further travel by the tip end fixture 32 and the mid-frame fixture 34 acts as a fulcrum about which the wind turbine blade 10 is bent when additional lateral forces are applied to the tip end portion 40 of the wind turbine blade 10. When the manufactured curve of the wind turbine blade 10 is facing in the same direction as the inside curve of the railroad 12 as shown in FIGS. 3 and 5, the direction of bending of the wind turbine blade 10 by the interaction of the tip end fixture 32 and the mid-frame fixture 34 is in the same direction as the inside of the manufactured curve.

Figure 6:
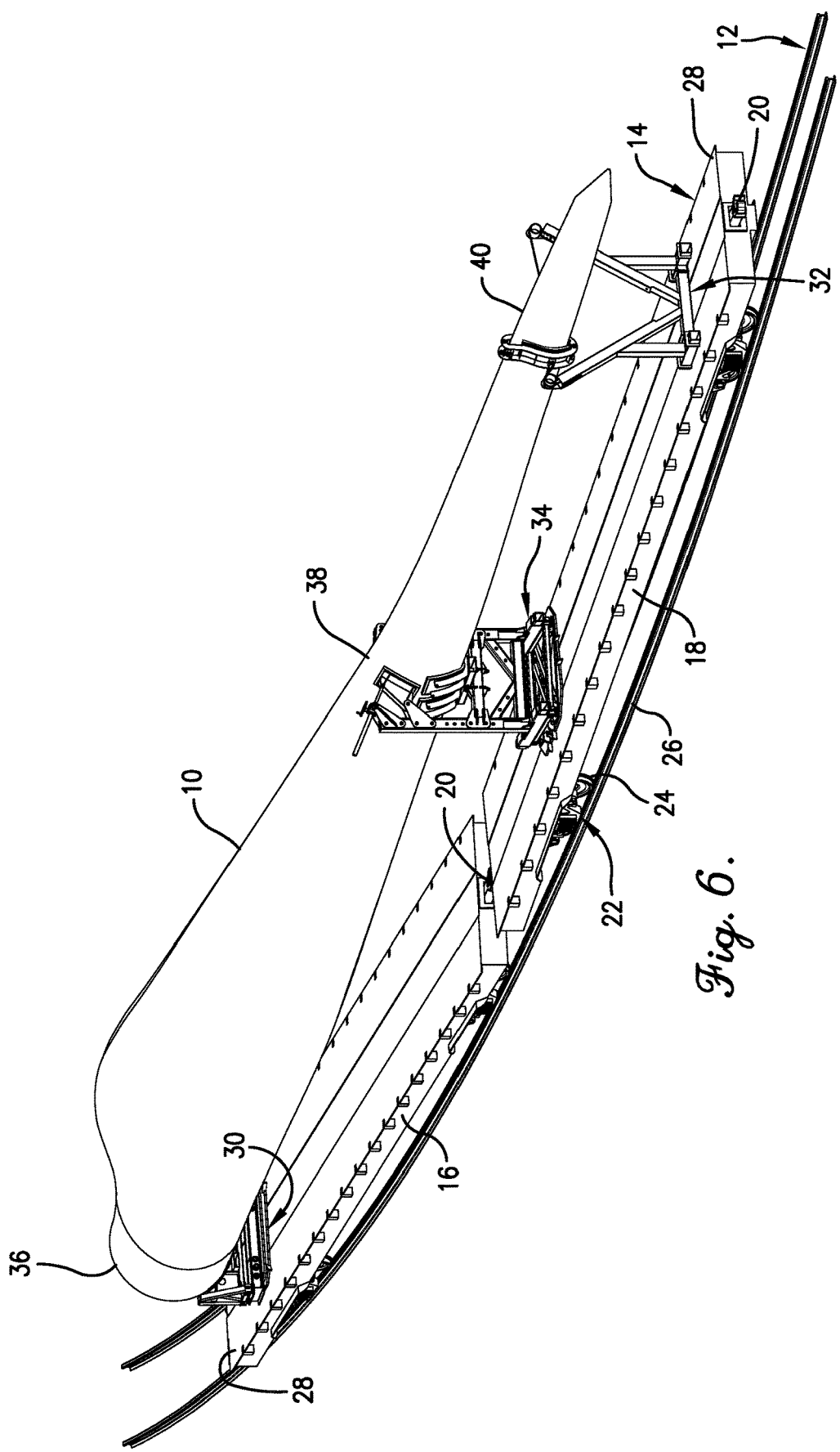
FIG. 6 is a side perspective view of the supported wind turbine blade shown on a length of the railroad curved in an opposite direction from that shown in FIG. 4.
Figure 7:
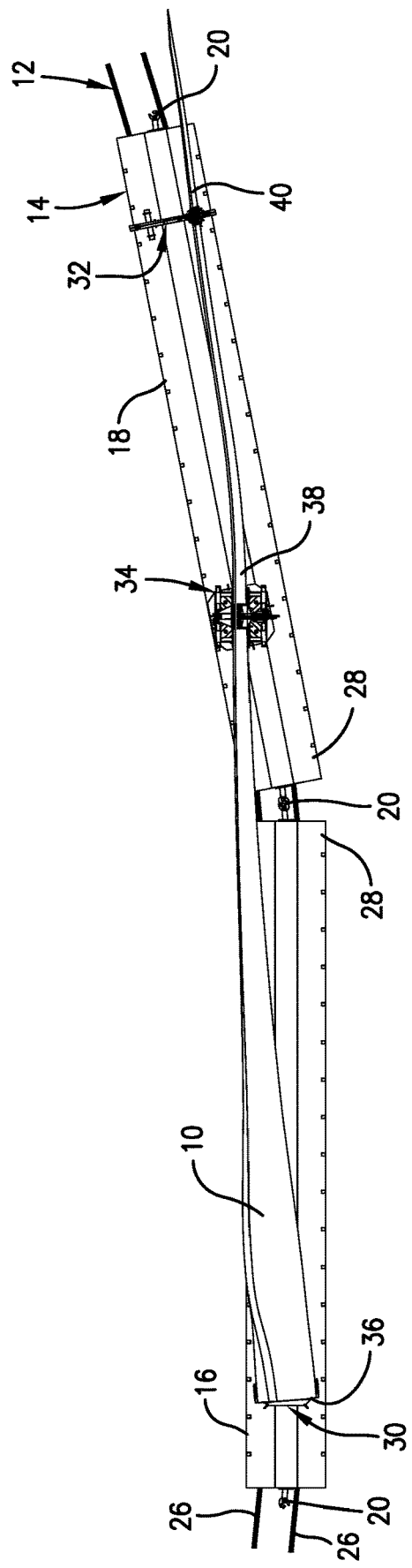
FIG. 7 is a top plan view of the supported wind turbine blade on the curved length of railroad shown in FIG. 6.

When the first and second railcars 16 and 18 are positioned on an oppositely curved length of the railroad 12 as shown in FIGS. 6 and 7, the tip end portion 40 of the wind turbine blade 10 swings outwardly in the opposite direction from that shown in FIGS. 4 and 5 and the tip end fixture 32 and the mid-frame fixture 34 cause bending of the wind turbine blade 10 in an opposite direction toward the outside of the manufactured curve in the wind turbine blade 10.

Figure 8:
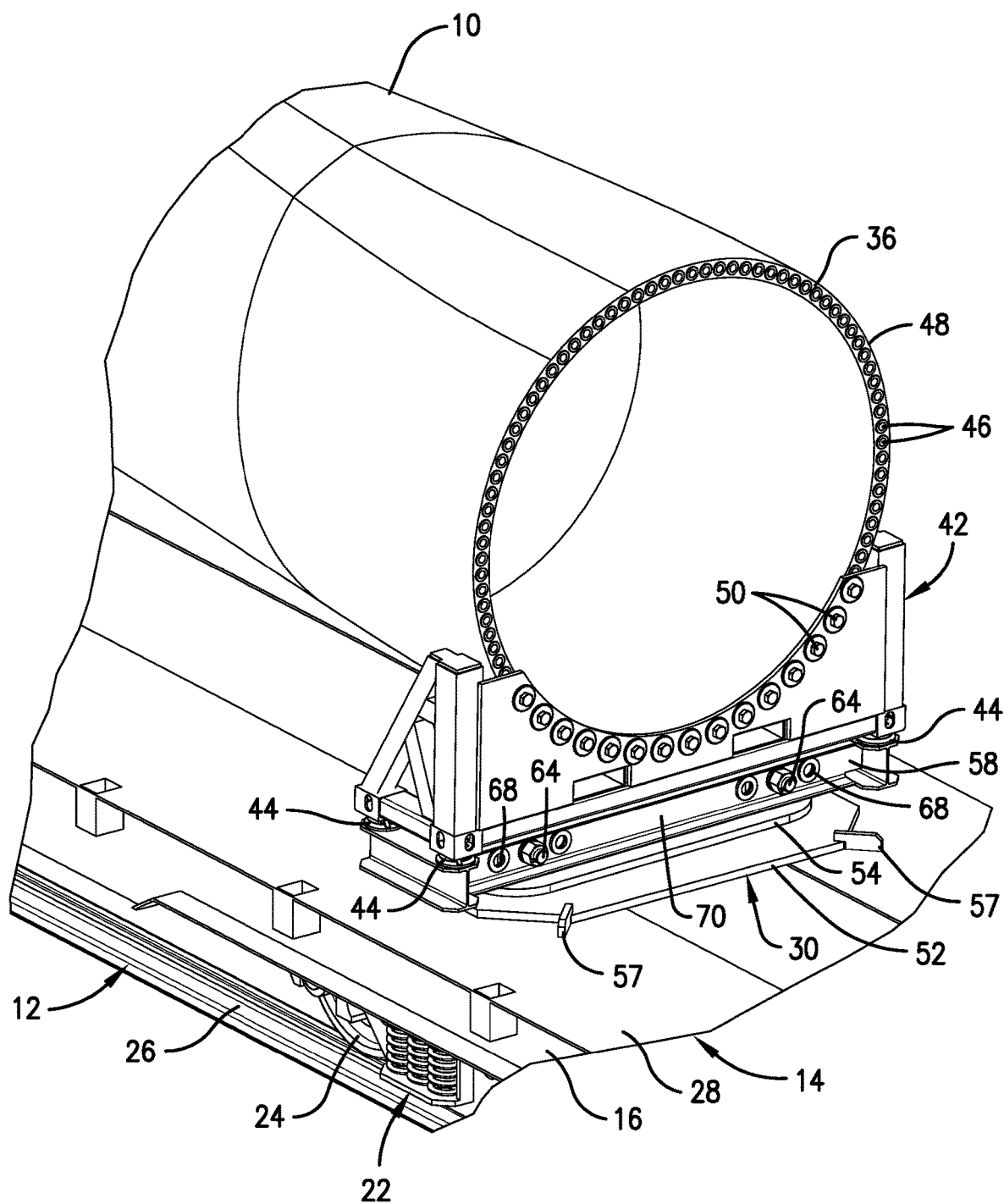
FIG. 8 is a fragmentary perspective view of the supported wind turbine blade showing the root end of the wind turbine blade supported by the root end fixture.
Figure 9:
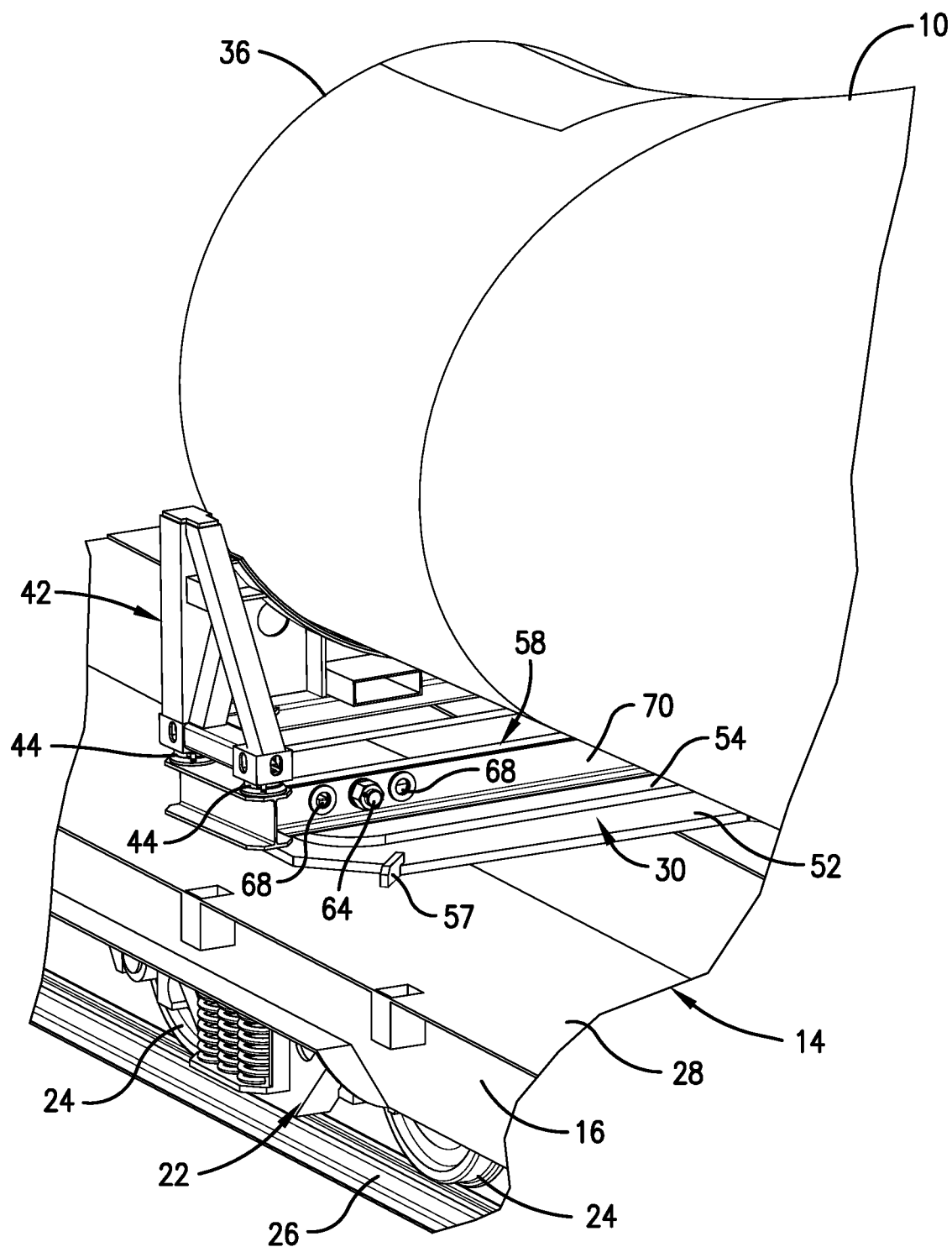
FIG. 9 is a fragmentary perspective view of the supported wind turbine blade showing the root end of the wind turbine blade and the root end fixture from the side and end opposite from those shown in FIG. 8.
Figure 10:
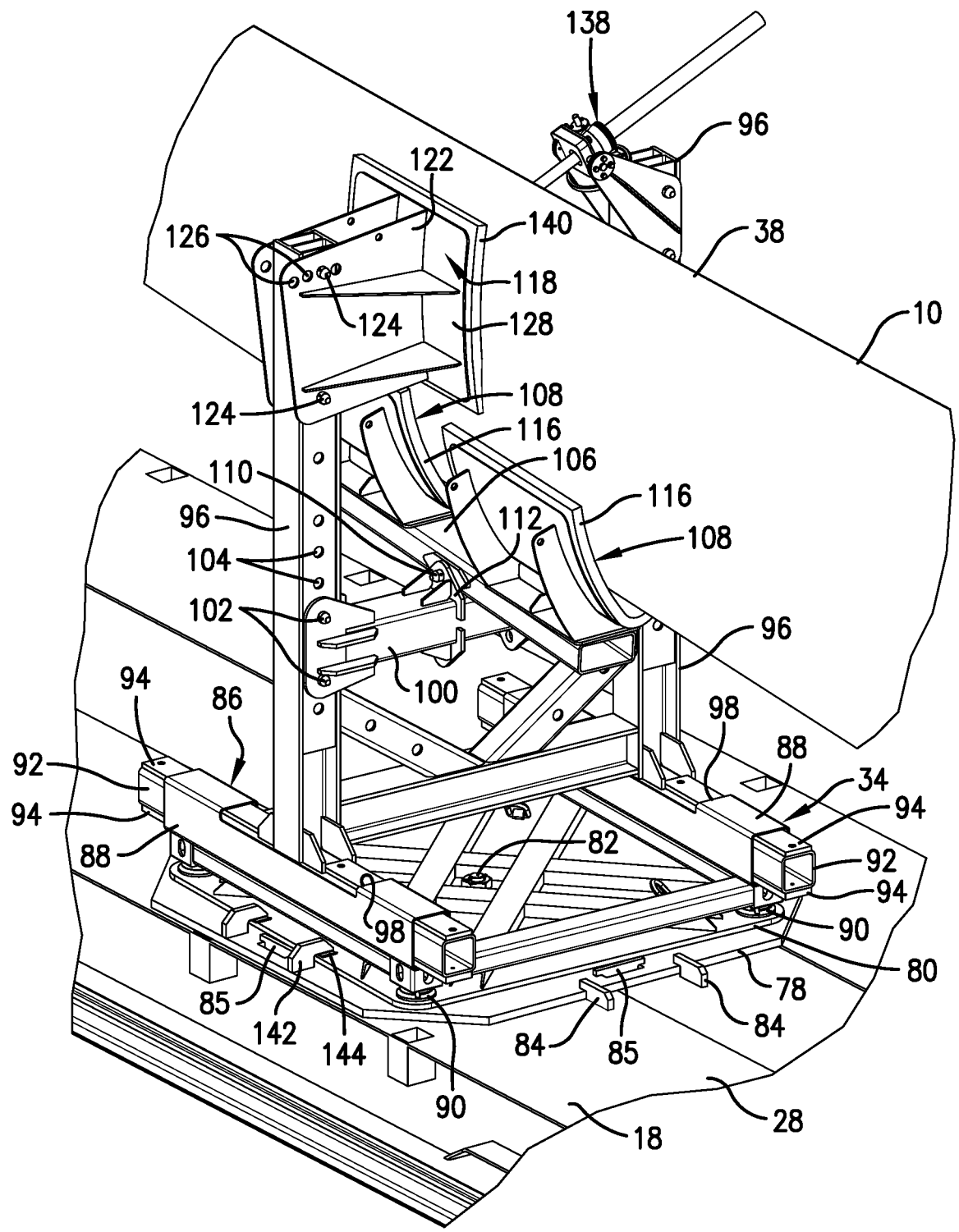
FIG. 10 is a fragmentary perspective view of the supported wind turbine blade showing the mid-frame fixture.
Figure 11:
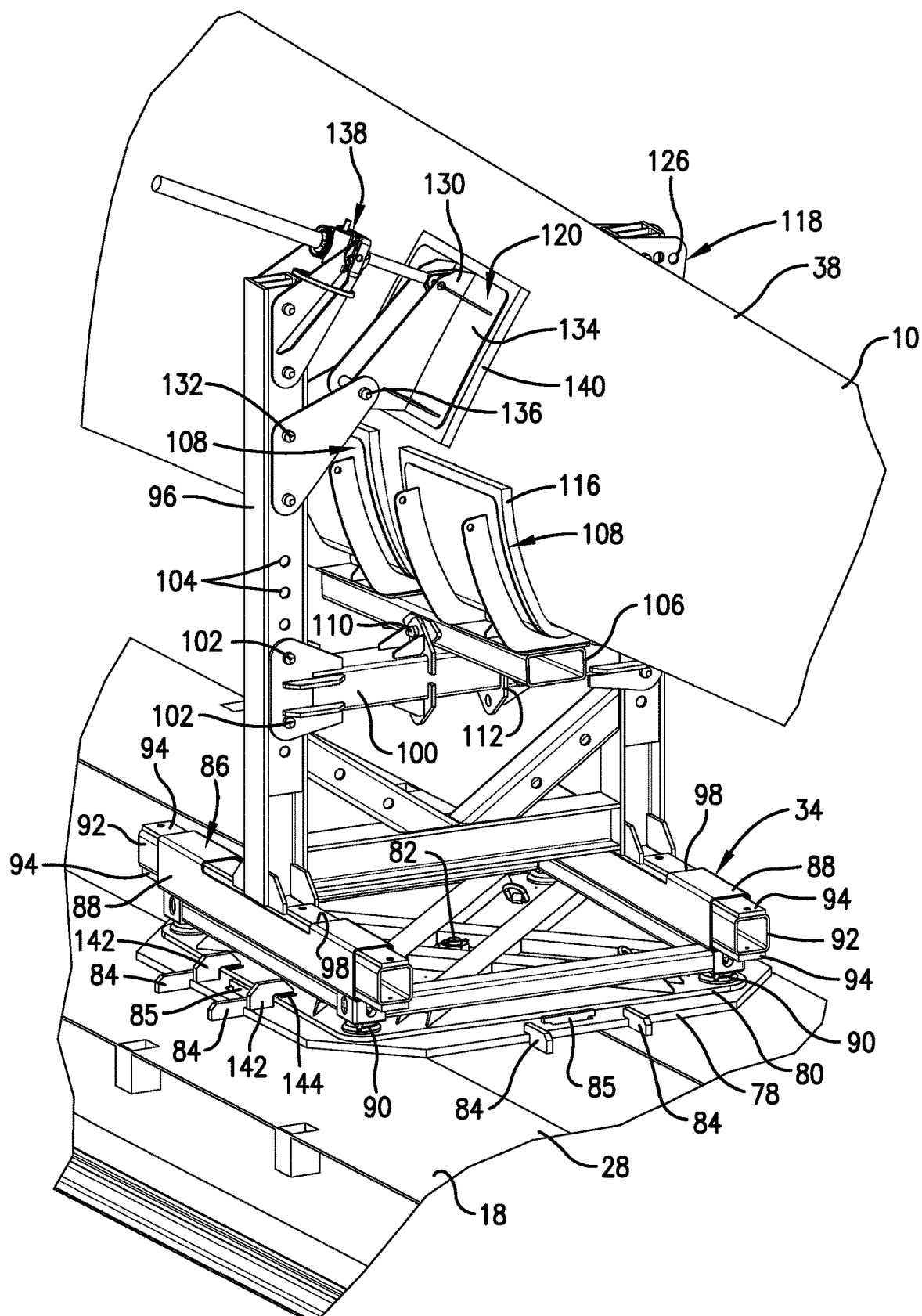
FIG. 11 is a fragmentary perspective view of the supported wind turbine blade showing the mid-frame fixture from the side and end opposite from those shown in FIG. 10.
Figure 12:
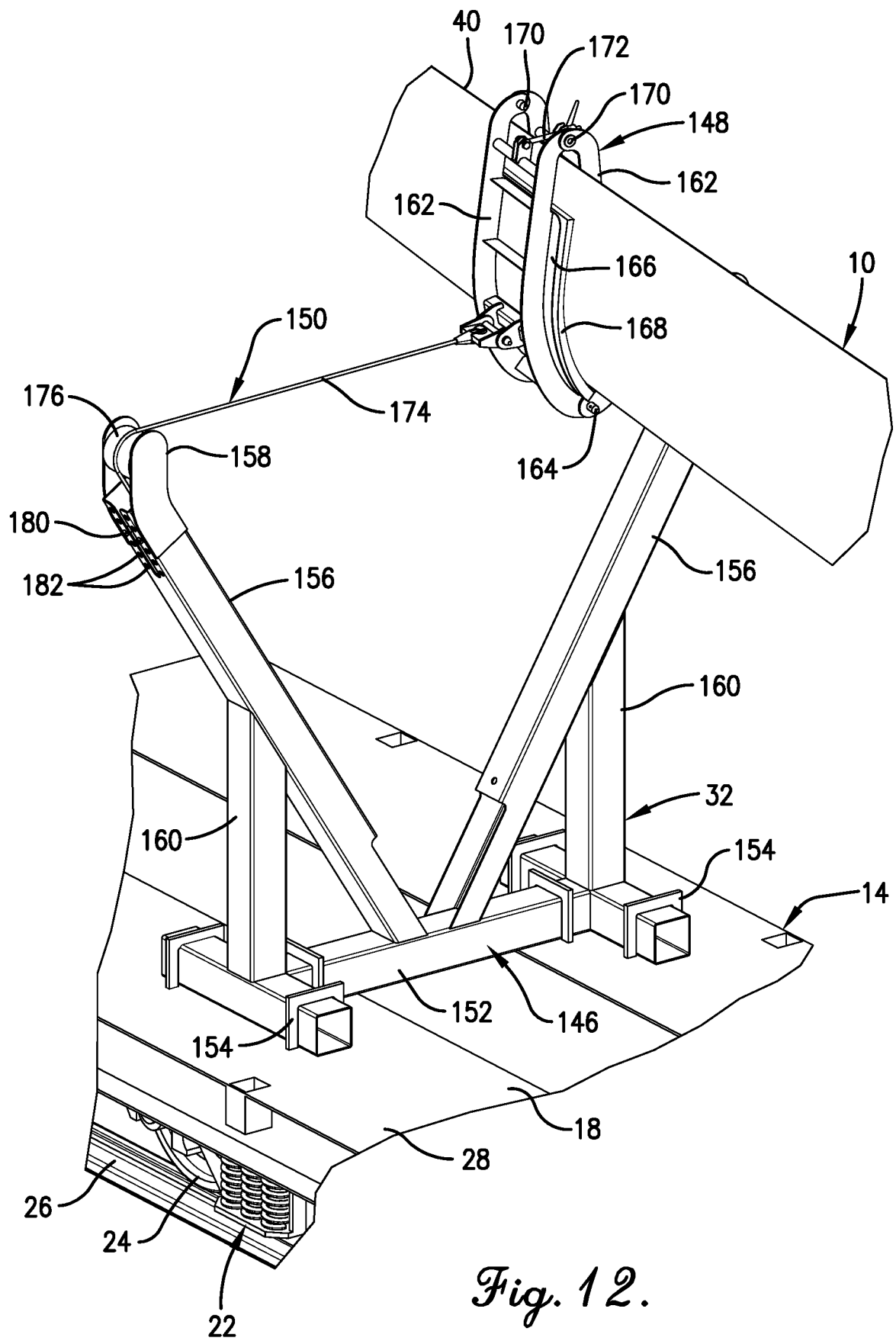
FIG. 12 is a fragmentary perspective view of the supported wind turbine blade showing the tip end portion of the wind turbine blade and the tip end fixture.
Figure 13:
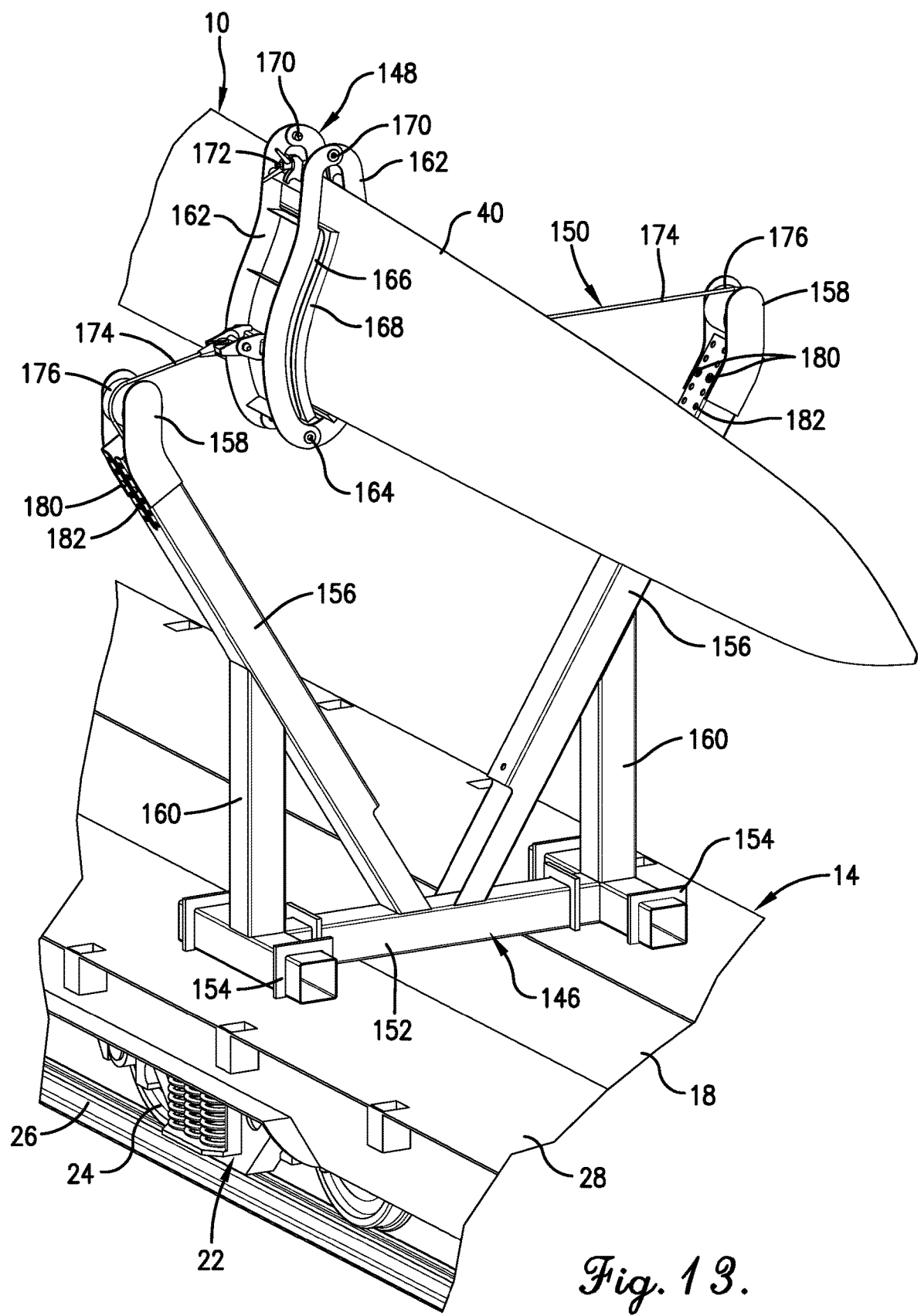
FIG. 13 is a fragmentary perspective view of the supported wind turbine blade showing the tip end portion of the wind turbine blade and the tip end fixture from the side and end opposite from those shown in FIG. 12.

Turning now to FIGS. 8 and 9, the root end fixture 30 in one embodiment may be connected to the root end 36 of the wind turbine blade 10 by a shipping frame 42. The shipping frame 42 is bolted to the root end 36 and is interconnected with the root end fixture 30 using twist lock fittings 44 or other methods of attachment. A series of female threaded bores 46 or a series of male threaded studs are provided in a circular wall 48 of the root end 36 to receive a series of bolts 50 (or nuts if studs are provided) that secure the shipping frame 42 to the root end 36. The bores 46 are circumferentially spaced around the root end 36 to allow the wind turbine blade 10 to be oriented and secured at different rotational positions about its longitudinal axis. As an example, the wind turbine blade 10 may be placed in one rotational position during shipping by cargo ship or during storage and a different rotational position during transport by the transport system 14.

Figure 14:
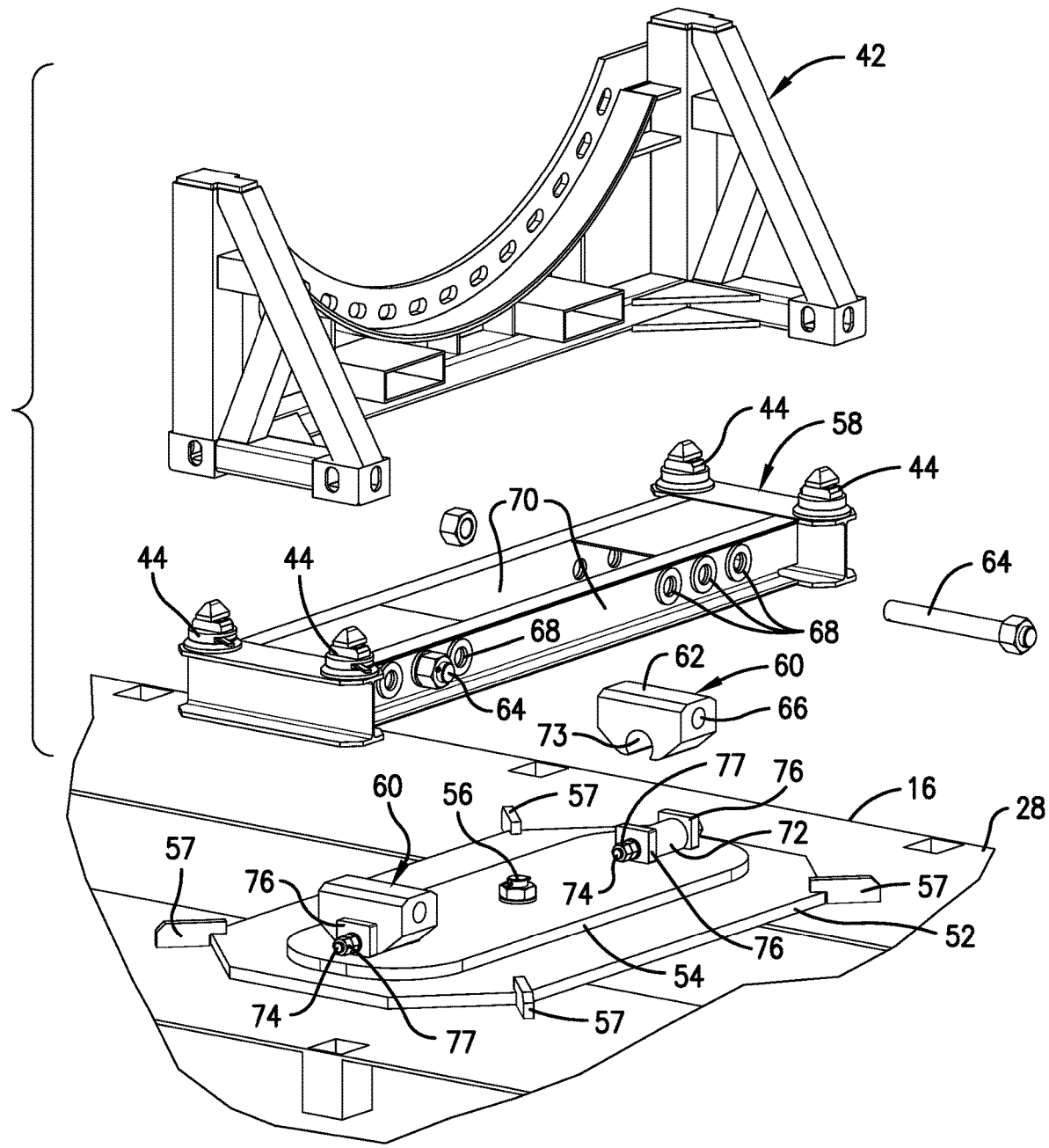
FIG. 14 is an exploded perspective view of the root end fixture and a portion of the first railcar.
Figure 15:
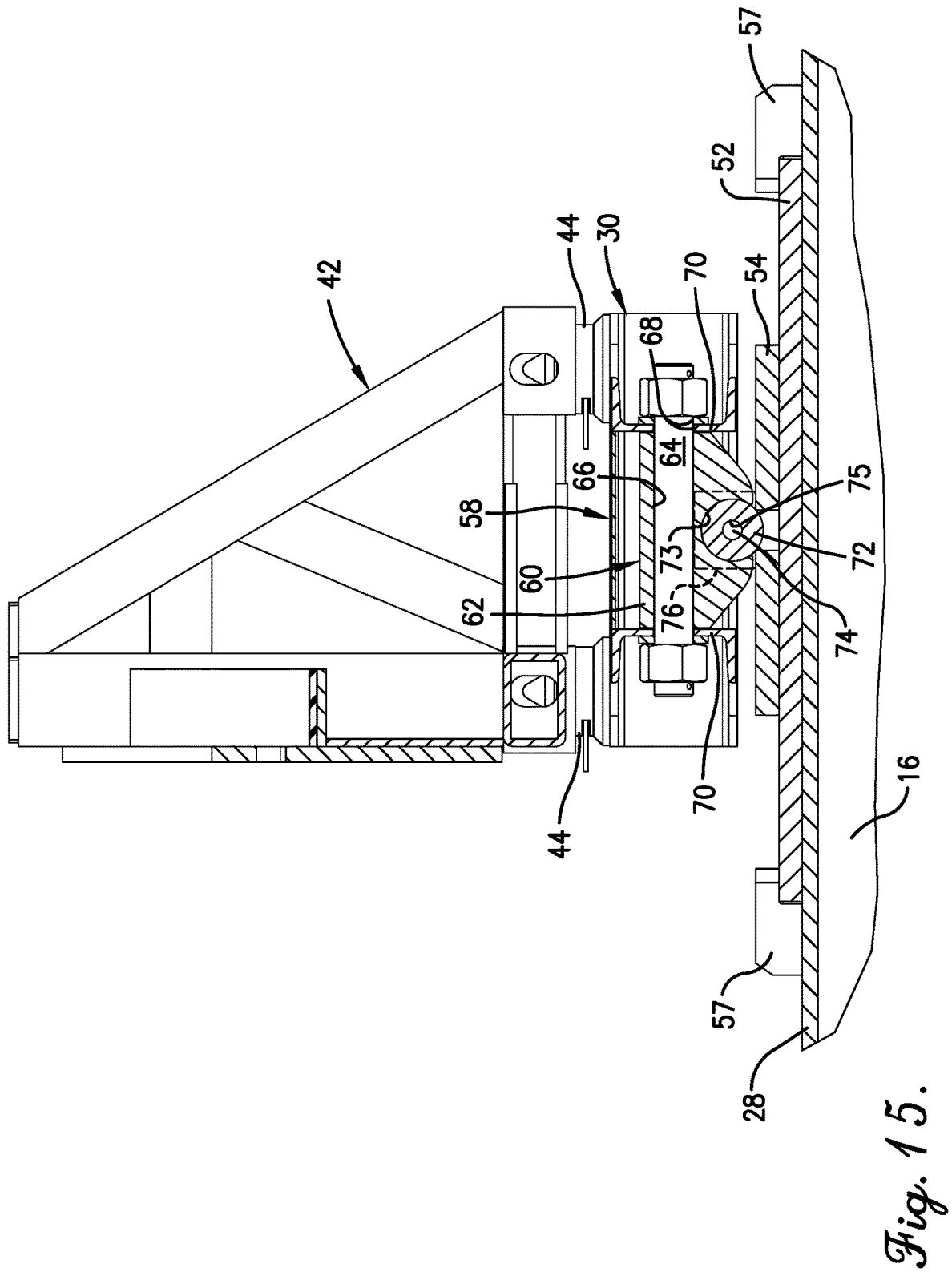
FIG. 15 is a side elevation view of the root end fixture taken in vertical section.
Figure 16:
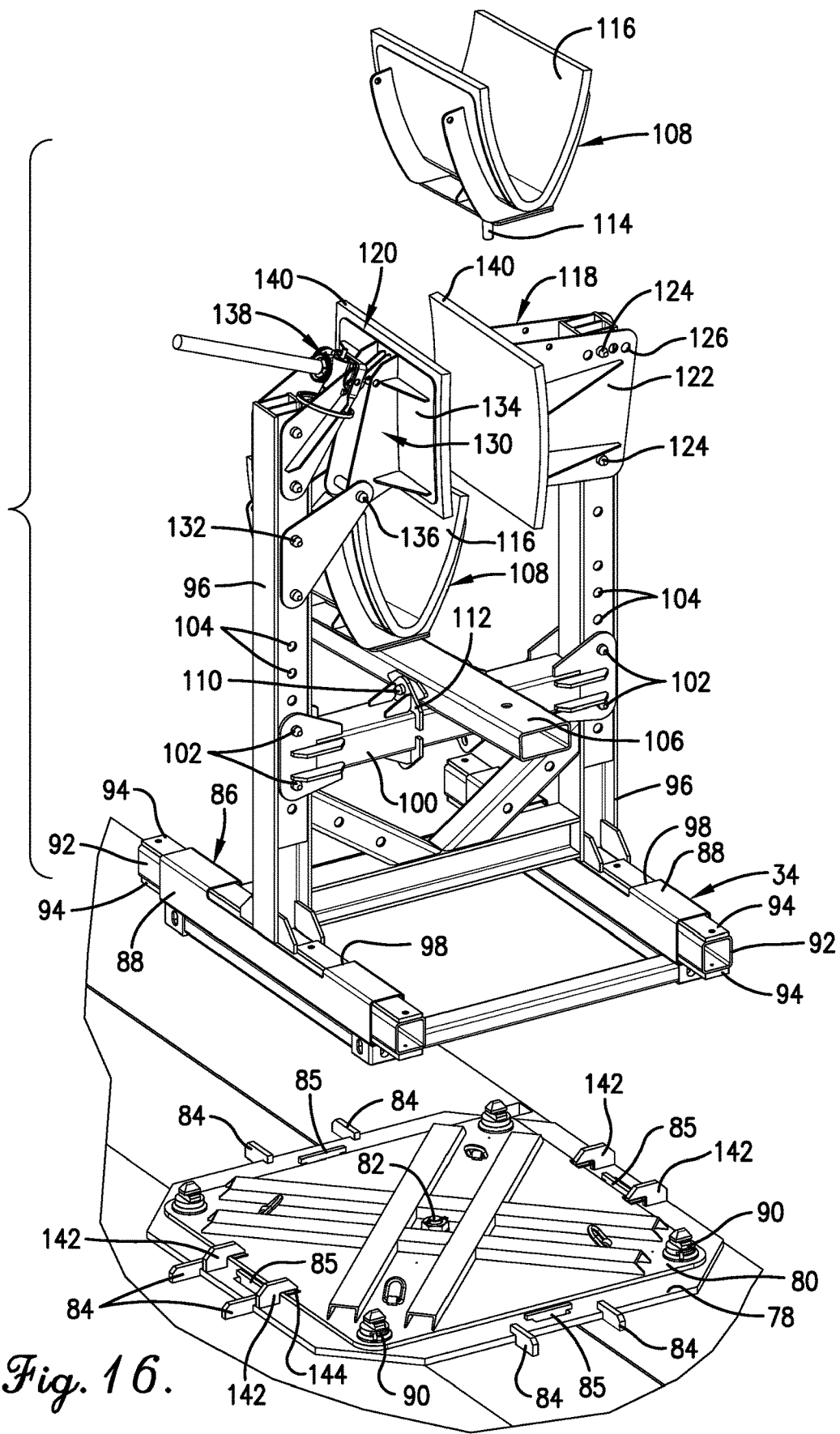
FIG. 16 is an exploded perspective view of the mid-frame fixture and a portion of the second railcar.
Figure 17:
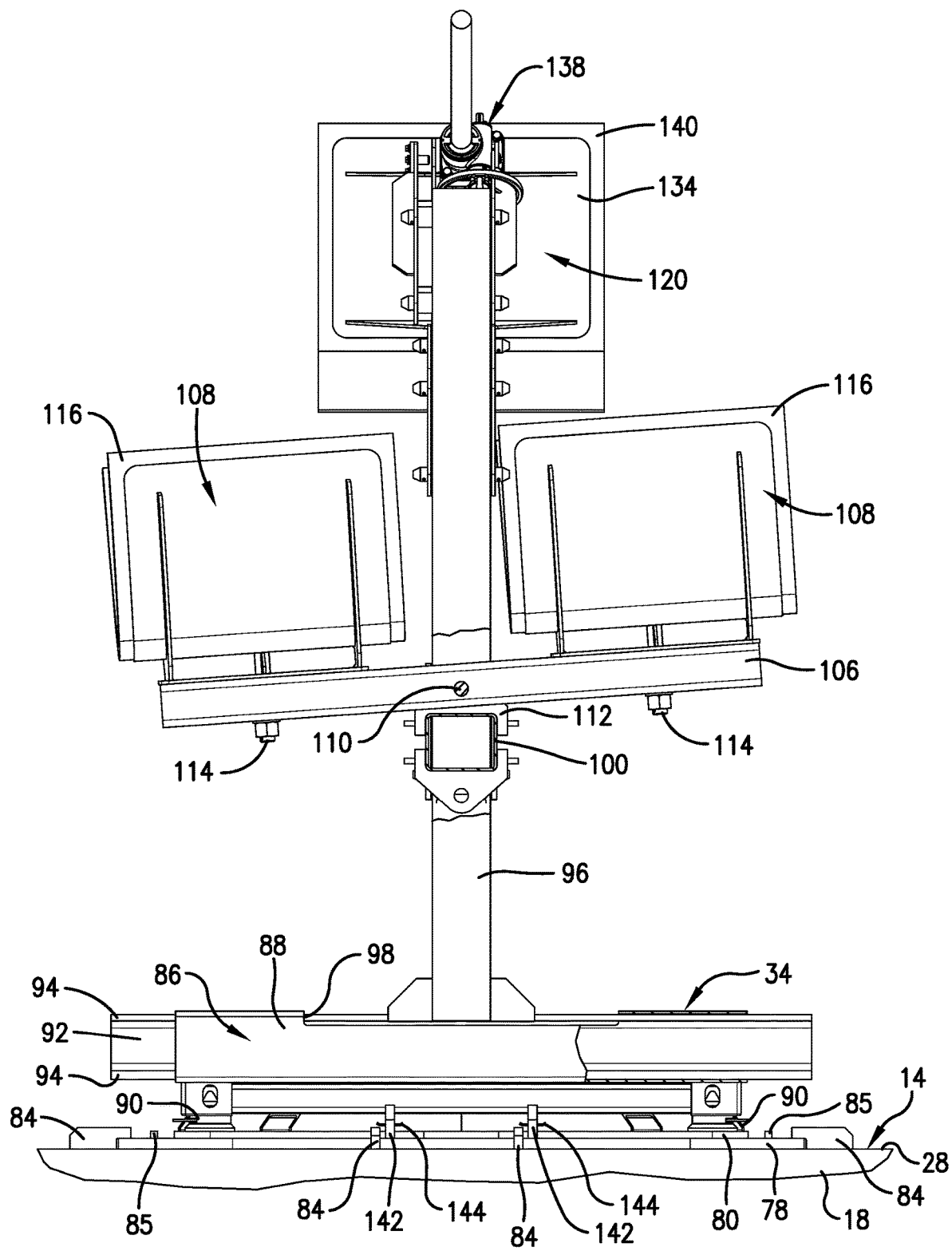
FIG. 17 is a side elevation view of the mid-frame fixture and a portion of the second railcar, with a portion of the mid-frame fixture broken away to show details of construction.
Figure 18:
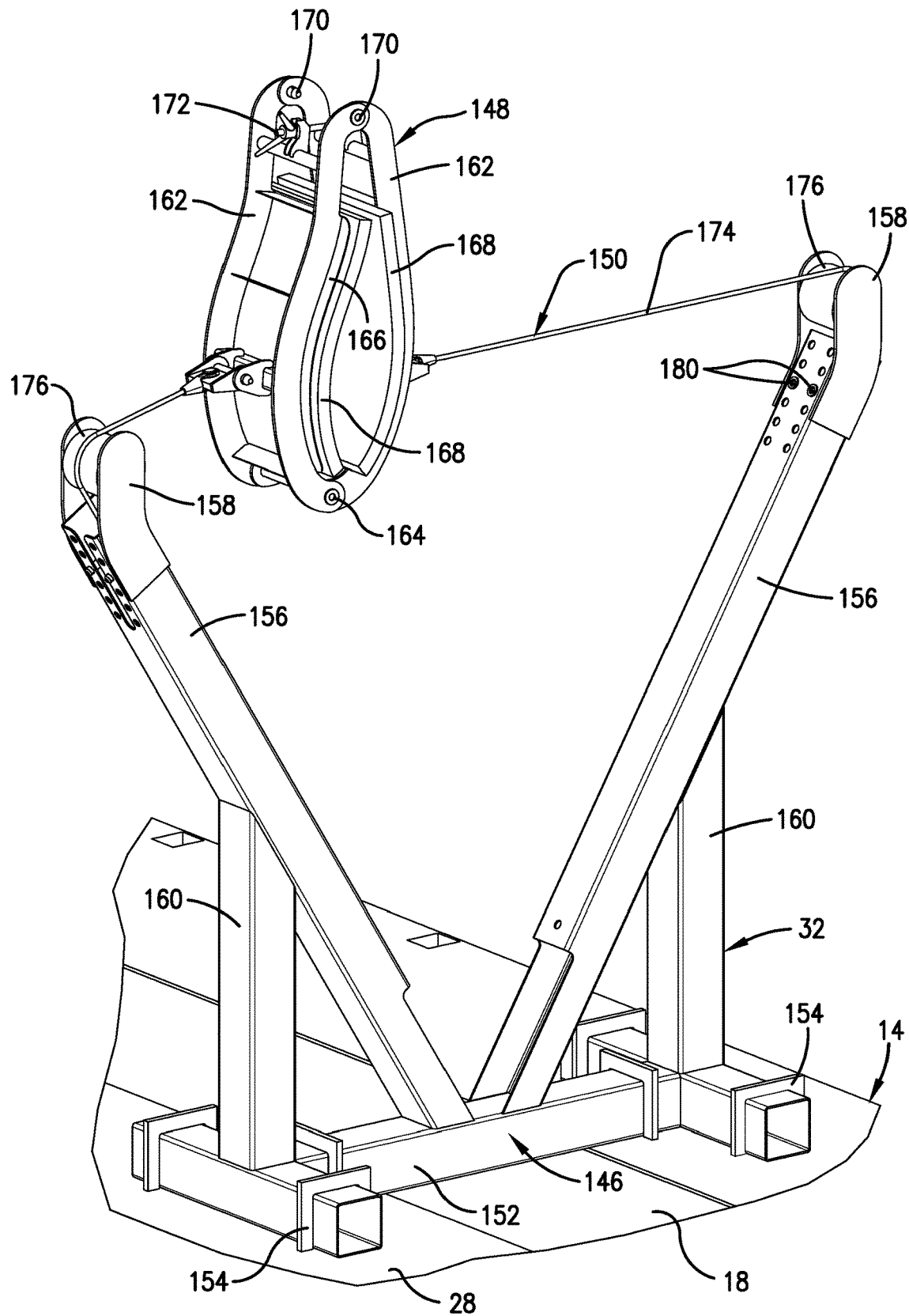
FIG. 18 is a fragmentary perspective view of the tip end fixture and a portion of the second railcar and showing a view similar to that of FIG. 13, but without the wind turbine blade.
Figure 19:
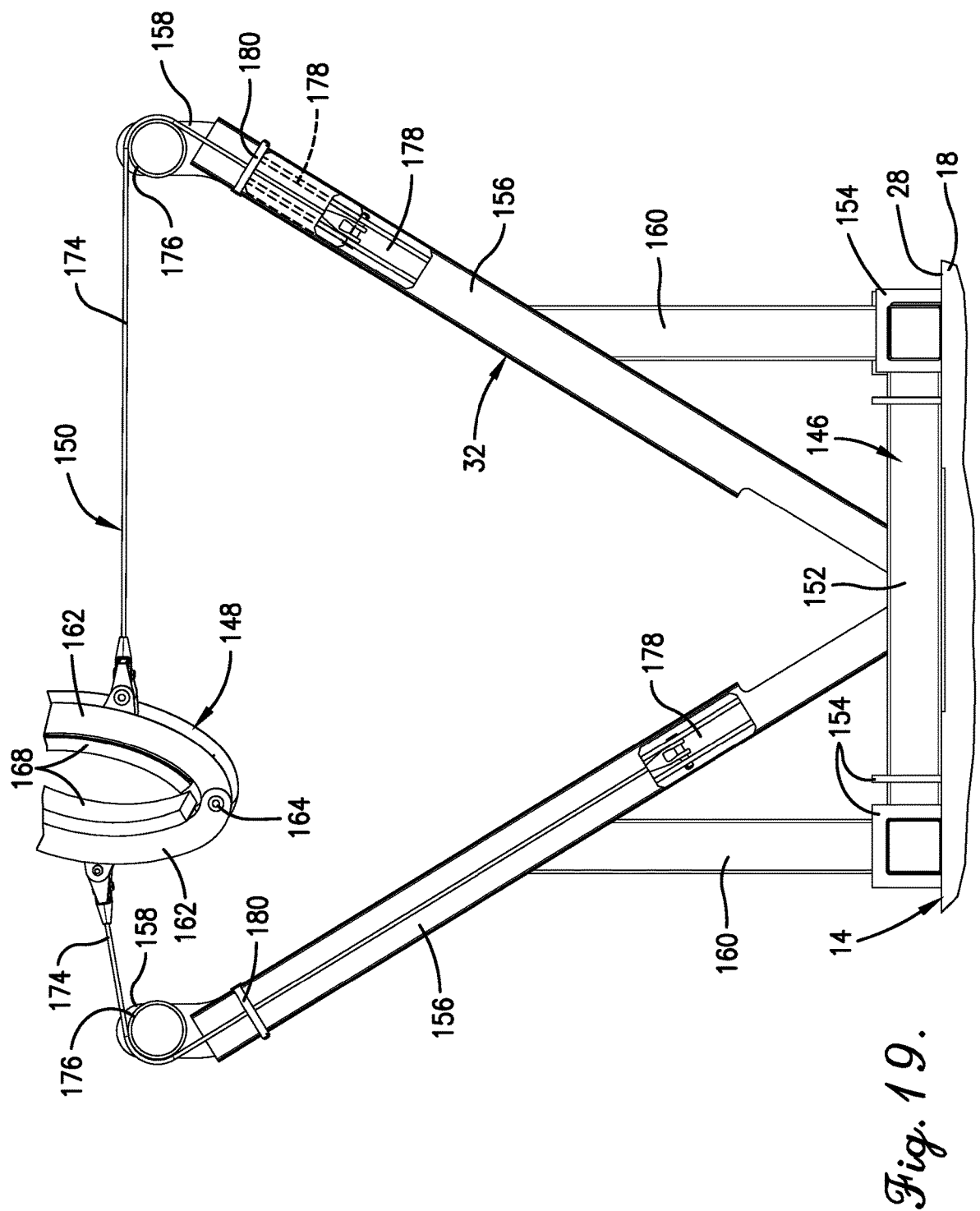
FIG. 19 is a fragmentary end elevation view of the tip end fixture with portions broken away to show details of construction.

As can best be seen in FIGS. 14 and 15, the root end fixture 30 in the one embodiment comprises a lower bolster plate 52 that is fixed against movement on the upper surface of the platform 28 of the first railcar 16 and an upper bolster plate 54 that rests on the lower bolster plate 52 and is secured to the lower bolster plate 52 by a center pin 56. The lower bolster plate 52 may be fixed to the platform 28 by clips 57 that are welded to the platform 28 and have a shoulder that bears against an upper surface of the lower bolster plate 52.

The root end fixture 30 further includes an upper, generally rectilinear frame 58 and a pair of rocking connectors 60 that attach the frame 58 to the upper bolster plate 54. The frame 58 has an upper surface on which the twist lock fittings 44 are mounted at the four corners of the frame 58 for attachment of the shipping frame 42. Each of the rocking connectors 60 that attach the frame 58 to the upper bolster plate 54 comprises a rocking block 62 that is secured to the frame 58.

In one embodiment, each of the rocking blocks 62 is secured to the frame 58 by a bolt or threaded pin 64 that extends through an upper bore 66 in the rocking block 62 and through reinforced holes 68 in a pair of spaced-apart rails 70 that form part of the frame 58. Each of the rails 70 has a number of the reinforced holes 68 through which each bolt or threaded pin 64 may extend to allow the lateral positioning of the frame 58 and, in turn, the root end 36 of the wind turbine blade 10, to be adjusted in relation to the lower and upper bolster plates 52 and 54 and the first railcar 16. For example, the frame 58 and the connected root end 36 may be centered at the centerline of the first railcar 16 or offset therefrom in either lateral direction.

Each of the rocking connectors 60 further includes a round stock 72 that is secured to the upper surface of the upper bolster plate 52, such as by welding directly to the upper surface of the upper bolster plate 52. A lower bore 73 in each rocking block 62 is fit over the round stock 72 to couple the frame 58 to the upper bolster plate 54. The lower bore 73 is open to form a lower radiused surface of the rocking block 62. To prevent lateral transverse motion of the rocking block 62 on the round stock 72, a rocker foot rod 74 is inserted through a bore 75 in the round stock 72 and secured on each side using keeper plates 76 and nuts 77. The lower surface of the rocking block 62 is beveled on either side of the lower bore 73 opening to allow the rocking block 62 to rock on the round stock 72. This freedom of movement allows the attached frame 58 and the root end 36 of the wind turbine blade 10 to pivot a preselected number of degrees about a transverse, horizontal pivot axis defined by the round stock 72. In one embodiment, the frame 58 and the root end 36 may rock or pivot up to eight degrees from the horizontal in one rotational direction and up to eight degrees in the opposite rotational direction. In another embodiment, the degree of rotation in either rotational direction is in the range of four to six degrees. In addition to this freedom of movement, the upper bolster plate 54 is able to pivot on the lower bolster plate 52 about a vertical pivot axis defined by the center pin 56.

The details of one embodiment of the mid-frame fixture 34 can best be seen in FIGS. 10, 11, 16 and 17. The mid-frame fixture 34 comprises a lower bolster plate 78 that is fixed against movement on the platform 28 of the second railcar 18 and an upper bolster plate 80 that rests on the lower bolster plate 78 and is secured to the lower bolster plate 78 by a center pin 82. The lower bolster plate 78 may be fixed to the platform 28 by clips 84 and 85 that are welded to the platform 28 and have a shoulder that bears against an upper surface of the lower bolster plate 78.

The mid-frame fixture 34 further includes a frame assembly 86 this is mounted on the upper bolster plate 80 and comprises a pair of square or rectangular, tubular outer rails 88 that are spaced apart from each other and extend longitudinally along opposed sides of the upper bolster plate 80 in the direction of travel of the transport system 14. Twist lock fittings 90 interconnect the underside of the outer rails 88 with the upper bolster plate 80. A longer square or rectangular, tubular inner rail 92 is positioned within each outer rail 88 and is able to move by slide-action. The inner rail 92 may include a layer 94 of low friction material on portions of its upper and lower surfaces to facilitate longitudinal sliding of the inner rail 92 within the outer rail 88.

The frame assembly 86 includes vertically-extending side frame members 96 that are secured to and extend upwardly from each inner rail 92 in a cutout 98 that is provided in each outer rail 88. The cutouts 98 have a longitudinal length selected to permit the inner rails 92 and the side frame members 96 that are carried by the inner rails 92 to move in forward and aft directions within a limited path of travel. The end of each cutout 98 acts as a stop when it is contacted by the associated side frame member 96.

The frame assembly 86 further includes a cross beam 100 that extends horizontally between the side frame members 96 and is connected to the side frame members 96 by pins 102 that extend through the ends of the cross beam 100 and through holes 104 provided in the side frame members 96. A series of the holes 104 is provided to allow the cross beam 100 to be attached to the side frame members 96 at various elevations. A rocking beam 106 is mounted on top of the cross beam 100 and carries a pair of spaced-apart blade support saddles 108 that each has a U-shaped profile. The rocking beam 106 is able to pivot about a transverse horizontal axis defined by a pivot pin 110 that extends through the rocking beam 106 and a pair of upstanding flanges 112 secured, such as by welding, to the cross beam 100. Each support saddle 108 is independently connected to the rocking beam 106 by a vertical pivot pin 114 that extends through the rocking beam 106 and allows the support saddle 108 to rotate about a vertical axis defined by the pivot pin 114. A layer 116 of padding material is normally applied to the upper surface of each support saddle 108 to protect the wind turbine blade 10 against damage when loaded onto the support saddles 108.

The ability of the support saddles 108 to independently rotate about their respective vertical axes allows each support saddle 108 to better conform to the curved shaped of the wind turbine blade 10 and reduced areas of localized pressure that may damage the wind turbine blade 10, particularly during bending of the wind turbine blade 10 when the tip end portion 40 of the wind turbine blade 10 is restrained against further movement and the mid-frame fixture 34 acts a fulcrum about which the wind turbine blade 10 is bent.

One of the side frame members 96 may also serve as a mount for a stationary side bumper 118 and the other side frame member may serve as a mount for a movable side bumper 120. The stationary side bumper 118 and the movable side bumper 120 are both positioned above the support saddles 108 and are designed to engage against opposite sides and prevent lateral movement of the wind turbine blade 10 when it is supported in the support saddles 108. The stationary side bumper 118 includes a frame 122 that is secured to the upper end of one of the side frame members 96, such as by using pins 124 that extend through holes 126 in the frame 122 and the side frame member 96, and a curved plate 128 that faces toward the other side frame member 96 and has a complemental shape to that of the side of the wind turbine blade 10. A series of the holes 126 is provided to allow the positioning of the curved plate 128 to be adjusted to accommodate different wind turbine blades 10.

The movable side bumper 120 likewise has a frame 130 that is mounted to an upper portion of the associated side frame member 96, such as by using pins 132, and a curved plate 134 that faces the curved plate 128 of the stationary side bumper 118 and is connected at its lower end to the frame 130 by a pivot pin 136. A jackscrew 138 may be mounted above the frame 130 on the side frame member 96 and is connected to an upper portion of the curved plate 134 so that extension and retraction of the jackscrew 138 causes pivoting movement of the curved plate 134 about the lower pivot pin 136. The jackscrew 138 is normally retracted to permit loading and unloading of the wind turbine blade and is extended to move the curved plate 134 toward the wind turbine blade 10 when it is loaded on the support saddles 108. One or more layers 140 of padding material are normally placed on the curved plates 128 and 134 to reduce the opportunity for damage to the wind turbine blade 10 when the stationary side bumper 118 and the movable side bumper 120 are brought into engagement against opposite sides of the wind turbine blade 10 to hold the wind turbine blade 10 against movement.

The mid-frame fixture 34 is constructed to allow the upper bolster plate 80 to rotate on the lower bolster plate 78 about the center pivot pin 82, the rocking beam 106 that carries the support saddles 108 is able to rotate about the transversely oriented horizontal pivot pin 110, the support saddles 108 are each independently able to rotate about their respective vertical pivot pins 114, and the inner rails 92 that carry the side frame members 96 are able to move forwardly and rearwardly in the direction of travel of the transport system 14. In one embodiment, the upper bolster plate 80 is able to rotate through an arc of up to ten degrees in one direction from a reference position and through an arc of up to ten degrees in the opposite direction from the reference position. The rocking beam 106 is able to pivot or rotate from a horizontal orientation through an arc of up to twelve degrees in one rotational direction and through the same arc in the opposite rotational direction. The inner rails 92 and side frame members 96 and are able to move forwardly up to twelve inches from a reference position and rearwardly up to twelve inches from that reference position.

In order to limit the distance the upper bolster plate 80 may lift off from the lower bolster plate 78 when large later forces are applied by the wind turbine blade 10 to one of the side frame members 96 during transit along a curved section of the railroad 12, limiter clips 142 are fixed, such as by welding, to the lower bolster plate 78 and carry a curved shoe 144 that is spaced within a few inches above the upper bolster plate 80. When the upper bolster plate 80 begins to deflect vertically a predetermined distance off of the lower bolster plate 78, it comes into contact with the curved shoe 144 and is prevented from lifting further above the lower bolster plate 78. The curved profile of the curved shoe 144 facilitates its ability to ride along the upper surface of the lifted upper bolster plate 80 as it rotates about the center pin 82.

One embodiment of the tip end fixture 32 can best be seen in FIGS. 12, 13, 18 and 19 and comprises a frame 146 that is fixed against movement to the platform 28 of the second railcar 18, a halo 148 that is engageable with the tip end portion 40 of the wind turbine blade 10, and a restraint device 150 that interconnects the halo 148 with the frame 146. The frame 146 comprises a base 152 formed of interconnected lengths of square or rectangular tubing that is secured to the platform 28, such as by U-shaped hold-down clips 154 that engage upper and side surfaces of the base 152 and are welded to the platform 28.

The frame 146 further includes a pair of uprights 156, each of which extends upwardly from the base 152 and terminates at an upper end 158 that is spaced above the platform 28 of the second railcar 18 at a level generally coincident with where the restraint device 150 connects with the halo 148. The upper ends 158 of the uprights 156 are spaced apart from each other, with one of the upper ends 158 being located above one side portion of the second railcar 18 and the other of the upper ends 158 being located above the opposite side portion of the second railcar 18. In one embodiment, the uprights 156 are positioned in an inclined orientation with their lower ends positioned closer together than their upper ends 158 to form a V-shaped structure. Reinforcing struts 160 connect a mid-portion of each upright 156 to the base 152 to form a strong, truss-like structure.

The halo 148 engages the opposite sides of the wind turbine blade 10 and, in one embodiment, has a clamshell construction with two side frames 162 that are joined together at their lower ends by a hinge pin 164. Each side frame 162 includes a curved face 166 that has a complemental shape to the curved side of the wind turbine blade 10. A layer 168 of padding material is provided on the curved face 166 to protect against damage to the wind turbine blade 10. The upper ends of the side frames 162 may be joined together by placement of pins 170 through overlapped holes provided in the side frames 162. One end of a dog-bolt and wing nut assembly 172 may be pivotally pinned to an upper portion of one of the side frames 162 and the other end of the dog-bolt and wing nut assembly 172 may releasably engage the other side frame 162 so that tightening of the dog-bolt and wing nut assembly 172 may bring the curved faces 166 and padding layers 168 into firm engagement against the sides of the wind turbine blade 10 to facilitate placement of the pins 170 in the overlapped holes in the upper ends of the side frames 162. The side frames 162 operate to apply a clamping force to the tip end portion 40 of the wind turbine blade 10 so that a restraining force applied to the halo 148 is directly transmitted to the wind turbine blade 10.

In one embodiment, the restraint device 150 that interconnects the halo 148 with the frame 146 comprises two lengths of cables 174. One of the lengths of cable 174 is connected at one end to one of the side frames 162 of the halo 148 and extends to the upper end 158 of one of the uprights 156. The other of the lengths of cables 174 is connected at one end to the other one of the side frames 162 and extends to the upper end 158 of the other one of the uprights 156. The other ends, or intermediate portions, of the lengths of cables 174 may be restrained in various fashions so that the halo 148 and the portion of the wind turbine blade 10 to which it is attached are restrained by the lengths of cables 174 against lateral movement beyond a preselected range of lateral movement. The range of lateral movement is located within the spacing between the uprights 156. In one embodiment, the spacing between the upper ends 158 of the uprights 156 is selected so that the range of lateral movement of the halo 148 and the portion of the wind turbine blade 10 is in the range of twelve to sixteen feet. In a more specific embodiment, the range of lateral movement is fourteen feet.

The other ends of the lengths of cables 174 may be attached to the uprights 156 or directly to the second railcar 18. In another embodiment, as can best be seen in FIG. 19, each length of cable 174 is routed over a curved surface 176 provided at the upper end 158 of the associated upright 156 and extends downwardly into the hollow interior of the upright 156 where it is attached to a stop block 178. The stop block 178 is able slide up and down within the interior of the upright 156 and the limit of its upward movement is set by a stop in the form of a pair of pins 180 that are positioned in holes 182 provided in opposite walls of the upright 156. A series of the holes 182 is provided to allow for adjustment of the upward limit of movement of the stop block 178.

When the first and second railcars 16 and 18 enter a curved section of the railroad 12, the tip end portion 40 of the wind turbine blade 10 and the attached halo 148 swing laterally in a direction away from the radial inner portion of the curve in the railroad 12. The wind turbine blade 10 and halo 148 freely move in the lateral direction to a predetermined position and then pull against the length of cable 174 that extends to the upright 156 positioned nearer the radial inner portion of the curve and lifts the stop block 178. When the stop block 178 is lifted sufficiently to engage the pins 180, as shown in broken lines in the right upright 156 in FIG. 19, the associated cable 174 is restrained against further movement and the halo 148 and the portion of the wind turbine blade 10 to which the halo 148 is attached are, in turn, restrained by the length of cable 174 and stopped from moving further in the lateral direction away from the radial inner portion of the curve in the railroad 12. The lateral movement of the halo 148 is normally stopped just short of the halo 148 being brought into contact with the upper end 158 of the upright 156. The restraining force exerted by the length of cable 174 on the halo 148 is normally exerted in a substantially horizontal direction to avoid exerting potentially damaging downward forces on the tip end portion 40 of the wind turbine blade 10. If additional lateral force is exerted on the tip end portion 40 after it is restrained by the length of cable 174, the wind turbine blade 10 will absorb that force by bending, with the mid-frame fixture 34 acting as the fulcrum for the bending moment.

When the first and second railcars 16 and 18 enter an oppositely curved section of the railroad 12, the other stop block 178 is lifted by the other length of cable 174 and lateral movement of the halo 148 and tip end portion 40 of the wind turbine blade 10 in the opposite direction are restrained when that stop block 178 is engaged against the pins 180.

Figure 20:
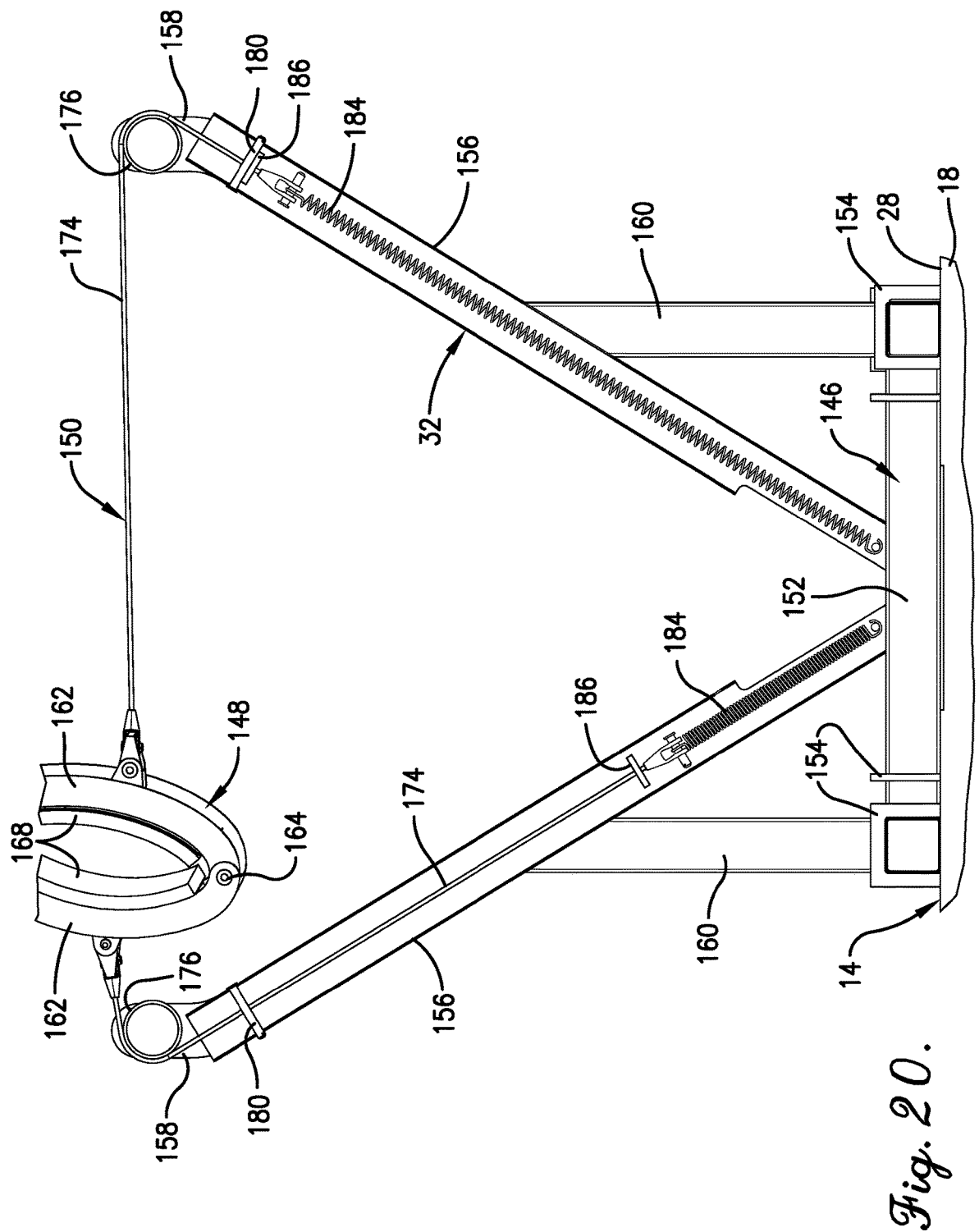
FIG. 20 is a fragmentary end elevation view of another embodiment of a tip end fixture with portions broken away to show details of construction.

In another embodiment as illustrated in FIG. 20, the other end of each of the lengths of cables 174 is attached to a coiled spring 184 rather than the stop block 178 within the hollow interior of the upright 156. A stop bar 186 mounted near the end of the cable 174 engages the pins 180 in a manner similar to the stop block 178 to limit the range of lateral movement of the halo 148 and tip end portion 40 of the wind turbine blade 10. The coiled spring 184 maintains tension on the cable 174 and prevents slackening of the lengths of cable 174.

In a further embodiment that is illustrated in FIG. 21, the lengths of cables 174 are portions of a single continuous length of cable. A series of pulleys 188*a*, 188*b* and 188*c* and a tensioning spring 190 allow the lengths of cable 174 to move within both uprights 156, with the range of lateral movement of the halo 148 and tip end portion 40 of the wind turbine blade 10 being controlled by engagement of the stop bars 186 against the pins 180. A set of upper pulleys 192 may be used in place of the curved surfaces at the upper ends 158 of the uprights 156 to facilitate the movement of the lengths of cable 174.

The method of using the transport system 14 to transport the wind turbine blade 10 includes the steps of loading the wind turbine blade 10 on the first and second railcars 16 and 18 by connecting the root end of the wind turbine blade 10 to the root end fixture 30, supporting the midsection 38 of the wind turbine blade 10 on the support saddles 108 of the mid-frame fixture 34 and optionally positioning the stationary and side bumpers 118 and 120 against the sides of the wind turbine blade 10, and mounting the halo 148 on the tip end portion 40 of the wind turbine blade 10.

As the transport system 14 travels along the railroad 12 and encounters curved sections of rails 26, the first and second railcars 16 and 18 become angled with respect to each other and transfer forces that urge movement of the wind turbine blade. The root end fixture 30 and the mid-frame fixture 34 have the several degrees of freedom of movement described above that allow some movement of the wind turbine blade 10 relative to the first and second railcars 16 and 18. The tip end portion 40 of the wind turbine blade 10 also swings outwardly in a lateral direction away from the inside of the curve. The restraint device 150 in the tip end fixture 32 restrains the tip end portion 40 of the wind turbine blade 10 against lateral movement outside of a preselected range of movement in the opposite lateral directions and causes bending of the wind turbine blade 10 about the mid-frame fixture 34 when the restraint device 150 imparts sufficient restraining force to the tip end portion 40 of the wind turbine blade 10. As a result, the tip end portion 40 remains within the specified clearance window for the railroad 12.

From the foregoing, it will be seen that this invention is one well adapted to attain all the ends and objectives hereinabove set forth together with other advantages that are inherent to the structure.

It will be understood that certain features and sub combinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A transport system for transporting a wind turbine blade along a railroad, said transport system comprising:
   a first railcar, a second railcar, and a third railcar that are coupled together;
   a root end fixture mounted to the first railcar for connecting with and supporting a root end portion of the wind turbine blade so that the wind turbine blade extends longitudinally along the first, second, and third railcars;
   a mid-frame fixture mounted to the second railcar for supporting a midsection of the wind turbine blade and comprising a frame assembly and a pair of support saddles that are carried by the frame assembly and within which a midsection of the wind turbine blade may be supported; and
   a tip end fixture mounted to the second railcar, the tip end fixture comprising a pair of uprights having upper ends that are spaced apart from each other, a halo for mounting on a tip end portion of the wind turbine blade, and a restraint device interconnecting the halo with both of the uprights for exerting a restraining force on the halo to stop movement of the tip end portion outside of a preselected range of movement in opposite lateral directions.

2. The transport system of claim 1, wherein the restraint device comprises lengths of cable connected at one end to opposite sides of the halo and extending to the uprights.

3. The transport system of claim 2, wherein opposite ends of the lengths of cable are connected to stop blocks positioned within and movable along the uprights and wherein stops are positioned within the uprights to set an upper limit to the movement of the stop blocks along the uprights.

4. The transport system of claim 2, wherein opposite ends of the lengths of cable are connected to springs that apply tension to the lengths of cable.

5. The transport system of claim 2, wherein the lengths of cable are portions of a single cable and are routed around a series of pulleys.

6. The transport system of claim 2, wherein the halo comprises a pair of side frames joined together at one end by a hinge pin and presenting faces that may apply a clamping force against opposite sides of the wind turbine blade when the halo is mounted on the tip end portion of the wind turbine blade.

7. A transport system for transporting a wind turbine blade along a railroad, said transport system comprising:
   a first railcar and a second railcar coupled together;
   a root end fixture mounted to the first railcar for connecting with and supporting a root end portion of the wind turbine blade so that the wind turbine blade extends longitudinally along at least the first and second railcars;
   a mid-frame fixture mounted to the second railcar for supporting a midsection of the wind turbine blade and comprising a frame assembly and a pair of support saddles that are carried by the frame assembly and within which the midsection of the wind turbine blade may be supported; and
   a tip end fixture mounted to the second railcar for exerting a restraining force on a tip end portion of the wind turbine blade to stop movement of the tip end portion of the wind turbine blade outside of a preselected range of movement in opposite lateral directions.

8. The transport system of claim 7, wherein the tip end fixture comprises a pair of uprights having upper ends that are spaced apart from each other, a halo for mounting on a tip end portion of the wind turbine blade, and a restraint device interconnecting the halo with both of the uprights, wherein the restraint device comprises lengths of cable connected at one end to opposite sides of the halo and extending to the uprights, wherein each of the uprights has a lower end and the uprights are positioned in an inclined orientation with the lower ends positioned closer together than their upper ends.

9. The transport system of claim 7, wherein the frame assembly includes a rocking beam on which the support saddles are mounted and which is able to pivot about a horizontal axis oriented in a lateral direction.

10. The transport system of claim 9, wherein the support saddles are mounted on the rocking beam in a manner so that they may pivot about a vertical axis independently of each other.

11. The transport system of claim 10, wherein the frame assembly is mounted on an upper bolster plate that is able to pivot with the frame assembly about a vertical axis.

12. The transport system of claim 11, wherein the frame assembly is able to move in forward and aft directions within a limited path of travel.

13. The transport system of claim 12, wherein the frame assembly includes vertically-extending side frame members that mount side bumpers above the support saddles for restraining lateral movement of the midsection of the wind turbine blade when mounted within the support saddles.

14. The transport system of claim 13, including a jackscrew associated with one of the side bumpers for moving that side bumper toward another one of the side bumpers.

15. The transport system of claim 13, wherein the root end fixture includes a frame for engagement with the root end portion of the wind turbine blade and rocking connectors that attach the frame to an upper bolster plate and allow pivoting of the frame about a horizontal axis oriented in a transverse direction.

16. A transport system for transporting a wind turbine blade along a railroad, said transport system comprising:
   a first railcar, a second railcar, and a third railcar that are coupled together;
   a root end fixture mounted to the first railcar for connecting with and supporting a root end portion of the wind turbine blade so that the wind turbine blade extends longitudinally along the first, second, and third railcars, the root end fixture comprising a frame for engagement with the root end portion of the wind turbine blade and rocking connectors that attach the frame to an upper bolster plate and allow pivoting of the frame about a horizontal axis oriented in a transverse direction;
   a mid-frame fixture mounted to the second railcar for supporting a midsection of the wind turbine blade and comprising a frame assembly and a pair of support saddles that are carried by the frame assembly and within which the midsection of the wind turbine blade may be supported; and
   a tip end fixture mounted to the second railcar for exerting a restraining force on a tip end portion of the wind turbine blade to stop movement of the tip end portion of the wind turbine blade outside of a preselected range of movement in opposite lateral directions.

17. The transport system of claim 16, wherein the tip end fixture comprising a pair of uprights having upper ends that are spaced apart from each other, a halo for mounting on a tip end portion of the wind turbine blade, and a restraint device interconnecting the halo with both of the uprights, wherein the restraint device comprises lengths of cable connected at one end to opposite sides of the halo and extending to the uprights.

18. The transport system of claim 17, wherein opposite ends of the lengths of cable are connected to stop blocks positioned within and movable along the uprights and wherein stops are positioned within the uprights to set an upper limit to the movement of the stop blocks along the uprights.

19. The transport system of claim 18, wherein the support saddles may pivot about a vertical axis independently of each other.

\* \* \* \* \*